(12) United States Patent
Huang et al.

(10) Patent No.: US 10,866,042 B1
(45) Date of Patent: *Dec. 15, 2020

(54) TAKEDOWN PIN FOR A FIREARM

(71) Applicant: BattleArms IP, LLC, Henderson, NV (US)

(72) Inventors: George Huang, Henderson, NV (US); Eli S. Brandt, Henderson, NV (US)

(73) Assignee: BattleArms IP, LLC, Henderson, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/160,973

(22) Filed: Oct. 15, 2018

Related U.S. Application Data

(63) Continuation-in-part of application No. 15/365,666, filed on Nov. 30, 2016, now Pat. No. 10,101,107.

(51) Int. Cl.
   *F41A 3/66*  (2006.01)
   *F16B 21/16* (2006.01)
   *F41A 11/00* (2006.01)

(52) U.S. Cl.
   CPC ............. *F41A 3/66* (2013.01); *F16B 21/165* (2013.01); *F41A 11/00* (2013.01)

(58) Field of Classification Search
   CPC .. F41A 11/04; F41A 11/00; F41A 3/66; F41A 11/02; F41A 3/64; F41C 21/165
   See application file for complete search history.

(56) References Cited

U.S. PATENT DOCUMENTS

| | | | |
|---|---|---|---|
| 5,509,226 A * | 4/1996 | Houde-Walter | F41G 1/35 362/110 |
| 10,126,078 B1 * | 11/2018 | Harris | F41A 11/00 |
| 2014/0317982 A1 | 10/2014 | Claudio | |
| 2015/0308768 A1 | 10/2015 | Mills | |
| 2016/0091268 A1 * | 3/2016 | Miller, III | F41A 17/46 42/70.06 |
| 2017/0016690 A1 | 1/2017 | Timmons | |
| 2017/0299292 A1 | 10/2017 | Daley, Jr. | |

FOREIGN PATENT DOCUMENTS

GB             572926         10/1945

* cited by examiner

*Primary Examiner* — Stephen Johnson
(74) *Attorney, Agent, or Firm* — Shaddock Law Group, PC

(57) ABSTRACT

A takedown pin for a firearm, having at least some of a head; a shank, wherein the shank extends from the head to a terminal surface; a projection extending from at least a portion of the terminal surface; a first groove or slot formed in at least a portion of the shank; a second groove or slot formed in at least a portion of the shank, wherein the first end of the first groove or slot is positioned at a spaced apart location from the first end of the second groove or slot; and a connecting groove or slot formed between the first end of the first groove or slot and the first end of the second groove or slot.

20 Claims, 24 Drawing Sheets

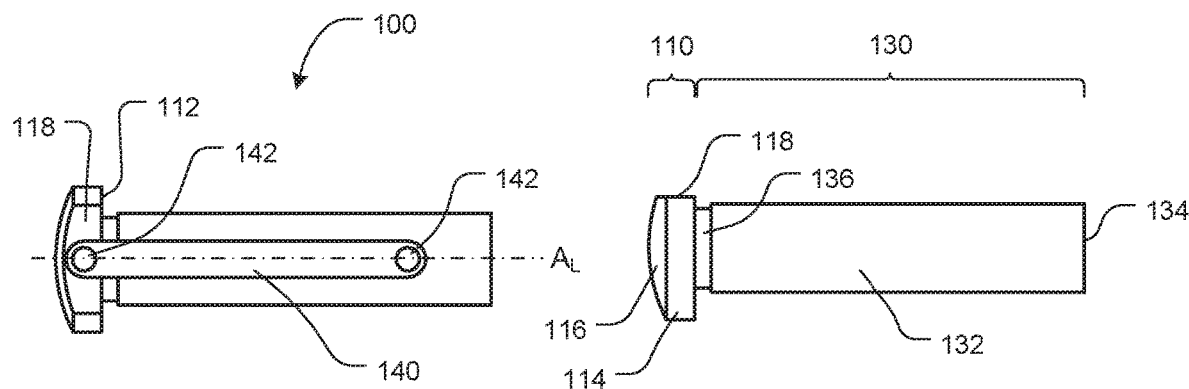
FIG. 2A
*PRIOR ART*
FIG. 2B
*PRIOR ART*
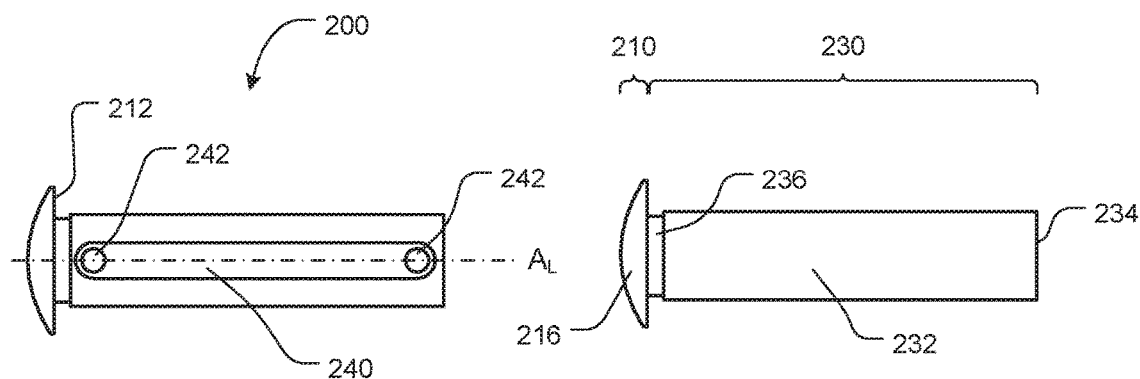
FIG. 3A
*PRIOR ART*
FIG. 3B
*PRIOR ART*

TAKEDOWN PIN FOR A FIREARM

CROSS-REFERENCE TO RELATED APPLICATIONS

This is a Continuation-In-Part of U.S. patent application Ser. No. 15/365,666, filed Nov. 30, 2016, now U.S. Pat. No. 10,101,107, issued Oct. 16, 2018, the entire disclosure of which is incorporated herein by reference.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

NOTICE OF COPYRIGHTED MATERIAL

The disclosure of this patent document contains material that is subject to copyright protection. The copyright owner has no objection to the reproduction by anyone of the patent document or the patent disclosure, as it appears in the Patent and Trademark Office patent file or records, but otherwise reserves all copyright rights whatsoever. Unless otherwise noted, all trademarks and service marks identified herein are owned by the applicant.

BACKGROUND OF THE DISCLOSURE

1. Field of the Disclosure

The present disclosure relates generally to the field of firearms. More specifically, the present disclosure relates to a takedown pin for a firearm.

2. Description of Related Art

Various firearms comprise certain components that are held together by one or more pins being releasably secured within apertures of the various components. Certain such firearms are the AR-15 or M4, the Fusil Automatique Léger (FAL), and the Special Operations Forces Combat Assault Rifle (SCAR) style firearm.

By way of example, the AR-15 is based on the AR-10, which was designed by Eugene Stoner, Robert Fremont, and L. James Sullivan of the Fairchild ArmaLite Corporation in 1957. Today, there are numerous variants of the AR-15 that are manufactured by a number of companies. The AR-15 and its various related derivative platforms are used by civilians, law enforcement personnel, and military forces around the world.

One of the reasons for the AR-15's widespread popularity and usage is its modularity. The AR-15 can initially be broken down into two main components, an upper receiver and a lower receiver. The upper receiver includes two lugs, each of which includes an aperture formed therethrough. The lower receiver includes cutouts for receiving the lugs of the upper receiver and appropriate apertures to be aligned with the upper receiver lug apertures.

When the upper receiver and the lower receiver are appropriately aligned, a pivot pin is slidably secured within the aligned apertures proximate the front of the lower receiver and a takedown pin is slidably secured within the aligned apertures proximate the rear of the lower receiver to secure the upper receiver to the lower receiver. Once initially installed within the appropriate apertures in the lower receiver, the pivot pin and the takedown pin each slide between a locked and an unlocked position, but remain attached or coupled to the lower receiver via interaction of a spring biased blocking element and a primary channel and primary recesses formed in the pivot pin and the takedown pin.

Because the upper and lower receivers are secured with slidably movable pins, the upper receiver can optionally be pivoted on the lower receiver or removed from the lower receiver. This allows a user to access various components of the firearm more easily for cleaning and lubrication. Additionally, alternate upper receivers can be used with a single lower receiver or vice versa.

Turning now to the drawing Figs., FIGS. 1-9 illustrate certain elements and/or aspects of a known, exemplary AR-15 upper receiver 10 being attached or coupled to an exemplary AR-15 lower receiver 20, using a known receiver pivot pin 100 and receiver take-down pin 200, to form a firearm 30.

The pivot pin 100 comprises a head 110 and a shank 130. The shank 130 includes a shank portion 132 that extends from a planar terminal surface 134 to a shoulder 112 of the head 110. In some embodiments, an intermediate portion 136, having a reduced diameter when compared to a diameter of the shank portion 132, is formed or disposed between the shank portion 132 and the shoulder 112.

The head 110 extends from the shoulder 112 to a crown 116. In certain embodiments, a face 114, which is parallel to the longitudinal axis $A_L$, is formed or disposed between the shoulder 112 and the crown 116. A flat 118 is typically provided in a portion of the head 110. A surface of the flat 118 is generally formed parallel to a longitudinal axis $A_L$ of the pivot pin 100 so as to allow the pivot pin 100 to be appropriately inserted within the lower pivot pin apertures 22 of the lower receiver 20.

A continuous, elongate slot 140 is formed in the pivot pin 100 and extends along the longitudinal axis $A_L$ from the shank portion 132 into the head 110. A detent 142 is formed proximate each end of the slot 140.

The take-down pin 200 comprises a head 210 and a shank 230. The shank 230 includes a shank portion 232 that extends from a planar terminal surface 234 to a shoulder 212 of the head 210. In some embodiments, an intermediate portion 236, having a reduced diameter when compared to a diameter of the shank portion 232, is formed or disposed between the shank portion 232 and the shoulder 212.

The head 210 extends from the shoulder 212 to a crown 216.

A continuous, elongate slot 240 is formed in the shank portion 232 of the take-down pin 200, along the longitudinal axis $A_L$ of the take-down pin 200. A detent 242 is formed proximate each end of the slot 240.

Generally, the upper receiver 10 includes an upper pivot pin lug 11 having an upper pivot pin aperture 12 and an upper take-down lug 17 having an upper takedown lug aperture 18. The lower receiver 20 includes cutouts, recesses, ears, or areas for receiving the lugs 11 and 17 so that the upper pivot pin aperture 12 can be aligned with the lower pivot pin apertures 22 and the upper takedown lug aperture 18 can be aligned with the lower take-down lug apertures 28.

The receiver pivot pin 100 is usually maintained within at least one of the lower pivot pin apertures 22 via engagement of a detent pin 43 within the slot 140 of the pivot pin 100. A detent pin spring 49 provides a spring biasing force that urges the detent pin 43 into the slot 140. Once the slot 140 is engaged by the detent pin 43, the pivot pin 100 is slidably movable between a release position and a locking position, but is maintained within at least one of the lower pivot pin apertures 22.

When the pivot pin 100 is in the release position, the shank portion 132 is outside of the cutout between the lower pivot pin apertures 22, sufficient to allow the upper pivot pin lug 11 to be positioned within or removed from the cutout between the lower pivot pin apertures 22. Alternatively, when the pivot pin 100 is in the locking position (as illustrated in FIG. 4), at least a portion of the shank portion 132 is positioned within each of the lower pivot pin apertures 22.

The detents 142 are formed so as to be engaged by the detent pin 43 at the release position and the locking position. In this manner, additional frictional engagement is provided between the detent pin 43 and the pivot pin 100 to further secure the pivot pin 100 in the release position or the locking position.

Similarly, the receiver take-down pin 200 is usually maintained within at least one of the lower take-down pin apertures 28 via engagement of a detent pin 41 within the slot 240 of the take-down pin 200. A detent pin spring 47 provides a spring biasing force that urges the detent pin 41 into the slot 240. Once the slot 240 is engaged by the detent pin 41, the take-down pin 200 is slidably movable between a release position and a locking position, but is maintained within at least one of the lower take-down pin apertures 28.

When the take-down pin 200 is in the release position, the shank portion 232 is outside of the cutout or void between the lower take-down pin apertures 28, sufficient to allow the upper take-down pin lug 17 to be positioned within or removed from the cutout between the lower take-down pin apertures 28. Alternatively, when the take-down pin 200 is in the locking position (as illustrated in FIG. 4), at least a portion of the shank portion 232 is positioned within each of the lower take-down pin apertures 28.

The detents 242 are formed so as to be engaged by the detent pin 41 at the release position and the locking position. In this manner, additional frictional engagement is provided between the detent pin 41 and the take-down pin 200 to further secure the take-down pin 200 in the release position or the locking position.

When the upper receiver 10 and the lower receiver 20 are appropriately aligned, the upper pivot pin lug aperture 12 is aligned between the lower pivot pin lug apertures 22 such that the pivot pin 100 can be slidably moved to the locking position and the upper takedown lug aperture 18 is aligned between the lower take-down lug apertures 28 such that the take-down pin 200 can be slidably moved to the locking position. Generally, attaching the upper receiver 10 to the lower receiver 20 is accomplished by first coupling or attaching, via the pivot pin 100, the upper pivot pin lug 11 to the lower receiver 20. Then, the upper receiver 10 is pivoted, via interaction between the pivot pin 100 and the upper pivot pin lug aperture 12, until the upper takedown lug aperture 18 is appropriately aligned between the lower take-down lug apertures 28 and the take-down pin 200 is slidably moved to the locking position.

The lower receiver 20, includes a pushbutton magazine release button 50 found on one side of the firearm 30. Ofttimes, the magazine release button 50 is at least partially protected by one or more ridges that reduce the chances of inadvertent activation.

The magazine release button 50 typically includes an internal, aperture 52 that extends through the entire magazine release button 50. The magazine release mechanism typically includes a magazine release button 50 that is coupled to a magazine release 55, which includes a magazine engagement projection 58 that releasably engages a portion of a magazine, when fully inserted within the magazine well of the firearm 30.

The magazine release 55 includes a magazine release connection shaft 56 that extends from one side of the magazine release. The magazine release connection shaft 56 includes a threaded portion 57 that can be threaded late engaged with the aperture 52 of the magazine release button 50.

A magazine release spring 59 typically provides spring biasing to the magazine release button 50, when installed in the firearm 30.

When the magazine release button 50 is depressed, the magazine release 55 is urged outside of the magazine well, such that the magazine engagement projection 58 is withdrawn from an inserted magazine, allowing the magazine to be removed from the magazine well.

It should be appreciated that a more detailed explanation of the components of the upper receiver 10, the lower receiver 20, the magazine release button 50, the pivot pin 100, and take-down pin 200, instructions regarding how to attach and remove the upper receiver 10 and the lower receiver 20, methods for utilizing the pivot pin 100 and/or the take-down pin 200, and certain other items and/or techniques necessary for the implementation and/or operation of the various components of the firearm 30 are not provided herein because such components are commercially available and/or such background information will be known to one of ordinary skill in the art. Therefore, it is believed that the level of description provided herein is sufficient to enable one of ordinary skill in the art to understand and practice the method as described.

Any discussion of documents, acts, materials, devices, articles, or the like, which has been included in the present specification is not to be taken as an admission that any or all of these matters form part of the prior art base or were common general knowledge in the field relevant to the present disclosure as it existed before the priority date of each claim of this application.

BRIEF SUMMARY OF THE DISCLOSURE

Known takedown pins only allow for two positions, an engaged or locked position and a disengaged or unlocked position. There is currently no takedown pin that allows for an intermediate, partially engaged or inoperably locked position. Furthermore, the elongate slot of known takedown pins are closed on both ends and do not include at least one open or partially open end of the elongate slot.

In various exemplary, non-limiting embodiments, the present disclosure comprises a takedown pin that provides not only slidable engagement between an engaged or locked position and a disengaged or unlocked position (similar to known takedown pins), but also slidable engagement between an engaged or locked position and a partially engaged or inoperably locked position. In the partially engaged or in operably locked position, the upper receiver 10 and the lower receiver 20 of the firearm 30 are capable of being only partially rotated relative to one another.

In certain exemplary, nonlimiting embodiments, the takedown pin is slidably movable, along the longitudinal axis of the takedown pin between the engaged or locked position and the disengaged or unlocked position. When in the engaged or locked position, the takedown pin can be rotated to an alternate engaged or locked position, wherein the takedown pin can be slidably movable, along the longitudinal axis of the takedown pin, between the alternate engaged or locked position and the partially engaged or inoperably locked position. In certain exemplary embodiments, the takedown pin is rotated approximately 180° between the engaged or locked position and the alternate engaged or locked position (between the first channel and a second channel). In certain other exemplary embodiments, the takedown pin is rotated approximately 90° between the engaged or locked position and the alternate engaged or locked position (between the first channel and a second channel).

In certain exemplary, nonlimiting embodiments, the takedown pin is slidably movable, along the longitudinal axis of the takedown pin between the engaged or locked position and the disengaged or unlocked position. When in the engaged or locked position, the takedown pin can be rotated to an alternate engaged or locked position, wherein the takedown pin can be slidably and rotatably movable, relative to the longitudinal axis of the takedown pin, between the alternate engaged or locked position and the partially engaged or inoperably locked position. In certain exemplary embodiments, the takedown pin is rotated approximately 90° between the alternate engaged or locked position and the partially engaged or inoperably locked position.

In various exemplary, nonlimiting embodiments, the takedown pin of the present disclosure comprises a head; a shank, wherein the shank extends, along a longitudinal axis, from the head to a terminal surface; a projection extending from at least a portion of the terminal surface; a first groove or slot formed in at least a portion of the shank, wherein a first detent recess is formed proximate a first end of the first groove or slot, and wherein a second detent recess is formed proximate a second end of the first groove or slot; a second groove or slot formed in at least a portion of the shank, wherein a first detent recess is formed proximate a first end of the second groove or slot, wherein a second detent recess is formed proximate a second end of the second groove or slot, and wherein the first end of the first groove or slot is positioned at a spaced apart location from the first end of the second groove or slot; and a connecting groove or slot formed between the first end of the first groove or slot and the first end of the second groove or slot.

In certain exemplary, nonlimiting embodiments, the first groove or slot defines an elongate, substantially linear first groove or slot that extends along the longitudinal axis.

In certain exemplary, nonlimiting embodiments, the first groove or slot limits the rotational movement and the longitudinal movement of the takedown pin, relative to a lower receiver.

In certain exemplary, nonlimiting embodiments, the first groove or slot limits the rotational movement of the takedown pin to 0°, relative to a lower receiver.

In certain exemplary, nonlimiting embodiments, when the takedown pin is appropriately positioned within a lower receiver of a firearm, a detent pin positioned at least partially within the first groove or slot interacts with the first groove or slot so that the takedown pin can be repeatedly urged between an engaged or locked position, wherein the firearm is operable, and a partially engaged or inoperably locked position, wherein the firearm is inoperable.

In certain exemplary, nonlimiting embodiments, the first detent recess of the first groove or slot is associated with the engaged or locked position and the second detent recess of the first groove or slot is associated with the partially engaged or inoperably locked position.

In certain exemplary, nonlimiting embodiments, the second groove or slot defines an elongate, substantially linear first groove or slot.

In certain exemplary, nonlimiting embodiments, the second groove or slot defines a substantially arcuate, second groove or slot.

In certain exemplary, nonlimiting embodiments, the second groove or slot limits the longitudinal movement of the takedown pin, relative to a lower receiver.

In certain exemplary, nonlimiting embodiments, the second groove or slot limits the rotational movement of the takedown pin to 90°, relative to a lower receiver.

In certain exemplary, nonlimiting embodiments, when the takedown pin is appropriately positioned within a lower receiver of a firearm, a detent pin positioned at least partially within the second groove or slot interacts with the second groove or slot so that the takedown pin can be repeatedly urged between an engaged or locked position, wherein the firearm is operable, and a disengaged or unlocked position, wherein the firearm is inoperable.

In certain exemplary, nonlimiting embodiments, the first detent recess of the second groove or slot is associated with the engaged or locked position and the second detent recess of the second groove or slot is associated with the disengaged or unlocked position.

In certain exemplary, nonlimiting embodiments, the first end of the first groove or slot is positioned approximately 180° around the shank from the first end of the second groove or slot.

In certain exemplary, nonlimiting embodiments, the connecting groove or slot is formed so that the takedown pin can be rotated such that a detent pin can engage at least a portion of the connecting groove or slot to transition between the first groove or slot and the second groove or slot.

In certain exemplary, nonlimiting embodiments, the projection includes an arcuate or semicircular surface portion.

In certain exemplary, nonlimiting embodiments, the projection comprises a pin that extends from the terminal surface of the shank.

In various exemplary, nonlimiting embodiments, the takedown pin of the present disclosure comprises a head; a shank, wherein the shank extends from the head to a terminal surface; a projection extending from at least a portion of the terminal surface; a first groove or slot formed in at least a portion of the shank; a second groove or slot formed in at least a portion of the shank, wherein the first end of the first groove or slot is positioned at a spaced apart location from the first end of the second groove or slot; and a connecting groove or slot formed between the first end of the first groove or slot and the first end of the second groove or slot.

In various exemplary, nonlimiting embodiments, the takedown pin of the present disclosure comprises a head; a shank, wherein said shank extends, along a longitudinal axis, from said head to a terminal surface; a projection extending from at least a portion of said terminal surface; a first groove or slot formed in at least a portion of said shank, wherein a first detent recess is formed proximate a first end of said first groove or slot, and wherein a second detent recess is formed proximate a second end of said first groove or slot; a second groove or slot formed in at least a portion of said shank, wherein a first detent recess is formed proximate a first end of said second groove or slot, wherein a second detent recess is formed proximate a second end of said second groove or slot, wherein said second end of said second groove or slot extends to an open or at least partially open end that extends through said terminal surface of said shank and through at least a portion of said projection, and wherein said first end of said first groove or slot is positioned at a spaced apart location from said first end of said second groove or slot; and a connecting groove or slot formed between said first end of said first groove or slot and said first end of said second groove or slot.

In various exemplary, nonlimiting embodiments, the takedown pin of the present disclosure comprises a head; a shank, wherein said shank extends from said head to a terminal surface; a first groove or slot formed in at least a portion of said shank, wherein a first detent recess is formed proximate a first end of said first groove or slot, wherein a second detent recess is formed proximate a second end of said first groove or slot, and wherein said second end of said first groove or slot extends to an open or at least partially open end that extends through said terminal surface of said shank; a second groove or slot formed in at least a portion of said shank, wherein a first detent recess is formed proximate a first end of said second groove or slot, wherein a second detent recess is formed proximate a second end of said second groove or slot, and wherein said first end of said first groove or slot is positioned at a spaced apart location from said first end of said second groove or slot; and a connecting groove or slot formed between said first end of said first groove or slot and said first end of said second groove or slot.

In various exemplary, nonlimiting embodiments, the takedown pin of the present disclosure comprises a head; a shank, wherein said shank extends from said head to a terminal surface; a projection extending from at least a portion of said terminal surface; a first groove or slot formed in at least a portion of said shank, wherein a first detent recess is formed proximate a first end of said first groove or slot, wherein a second detent recess is formed proximate a second end of said first groove or slot; and a second groove or slot formed in at least a portion of said shank, wherein said first end of said first groove or slot is positioned at a spaced apart location from said first end of said second groove or slot.

Accordingly, the present disclosure separately and optionally provides a takedown pin for a firearm that provides not only slidable engagement between an engaged or locked position and a disengaged or unlocked position, but also slidable engagement between an engaged or locked position and a partially engaged or inoperably locked position.

The present disclosure separately and optionally provides a takedown pin for a firearm that allows an upper receiver and a lower receiver of a firearm to be only partially rotated relative to one another.

The present disclosure separately and optionally provides a takedown pin for a firearm that can be easily retrofitted to a firearm.

These and other aspects, features, and advantages of the present disclosure are described in or are apparent from the following detailed description of the exemplary, non-limiting embodiments of the present disclosure and the accompanying figures. Other aspects and features of embodiments of the present disclosure will become apparent to those of ordinary skill in the art upon reviewing the following description of specific, exemplary embodiments of the present disclosure in concert with the figures. While features of the present disclosure may be discussed relative to certain embodiments and figures, all embodiments of the present disclosure can include one or more of the features discussed herein. Further, while one or more embodiments may be discussed as having certain advantageous features, one or more of such features may also be used with the various embodiments of the disclosure discussed herein. In similar fashion, while exemplary embodiments may be discussed below as device, system, or method embodiments, it is to be understood that such exemplary embodiments can be implemented in various devices, systems, and methods of the present disclosure.

Any benefits, advantages, or solutions to problems that are described herein with regard to specific embodiments are not intended to be construed as a critical, required, or essential feature(s) or element(s) of the present disclosure or the claims.

BRIEF DESCRIPTION OF THE SEVERAL VIEWS OF THE DRAWINGS

As required, detailed exemplary embodiments of the present disclosure are discussed herein; however, it is to be understood that the disclosed embodiments are merely exemplary of the disclosure that may be embodied in various and alternative forms, within the scope of the present disclosure. The figures are not necessarily to scale; some features may be exaggerated or minimized to illustrate details of particular components. Therefore, specific structural and functional details disclosed herein are not to be interpreted as limiting, but merely as a basis for the claims and as a representative basis for teaching one skilled in the art to employ the present disclosure.

The exemplary embodiments of the present disclosure will be described in detail, with reference to the following figures, wherein like reference numerals refer to like parts throughout the several views, and wherein:

FIG. 2A illustrates a front view of a known firearm pivot pin;

FIG. 2B illustrates a left side view of a known firearm pivot pin;

FIG. 3A illustrates a front view of a known firearm take-down pin;

FIG. 3B illustrates a left side view of a known firearm take-down pin;

DETAILED DESCRIPTION OF THE DISCLOSURE

Figure 1:
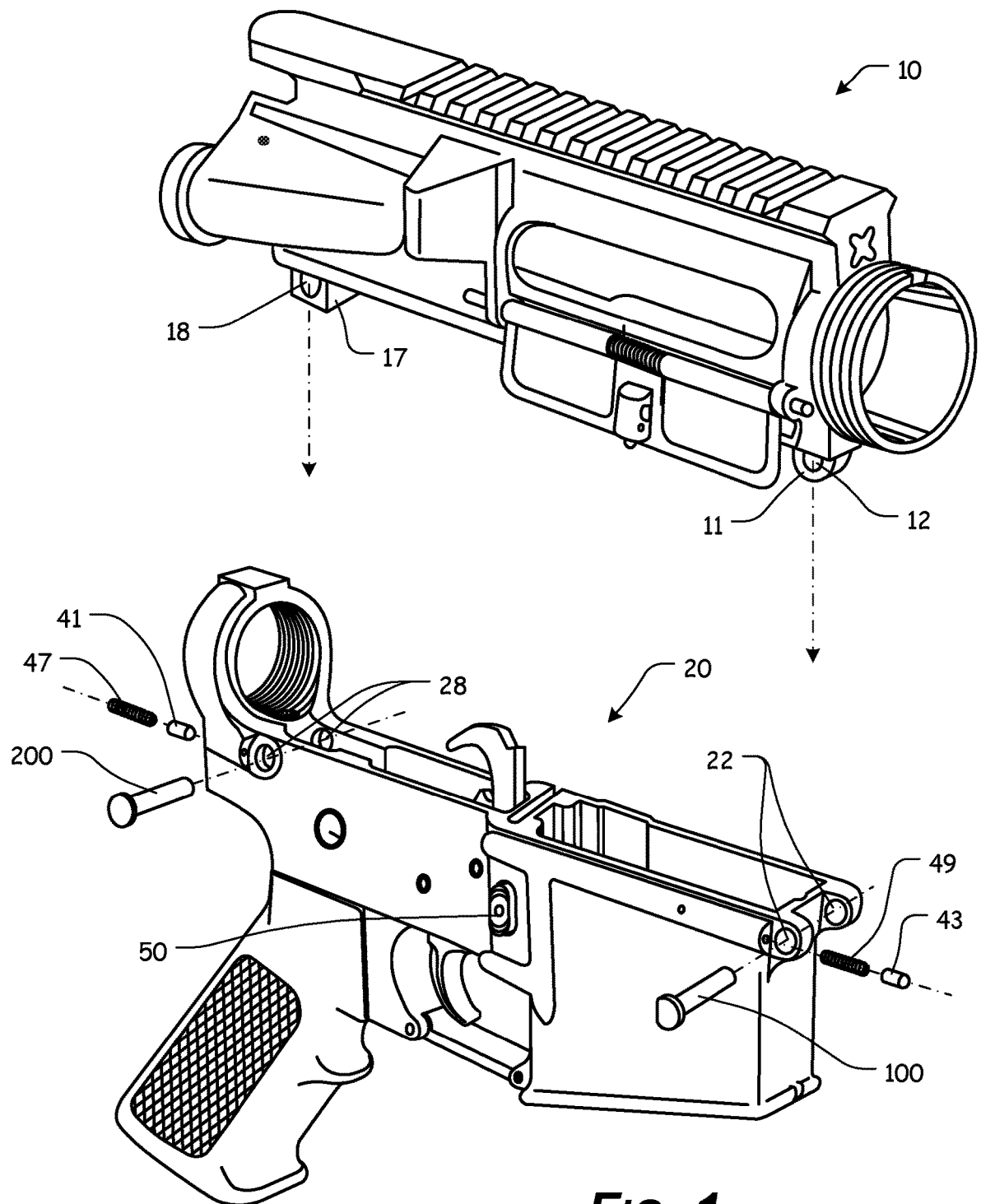
FIG. 1 illustrates a perspective view of certain components of an AR-15 style upper and lower receiver.
Figure 4:
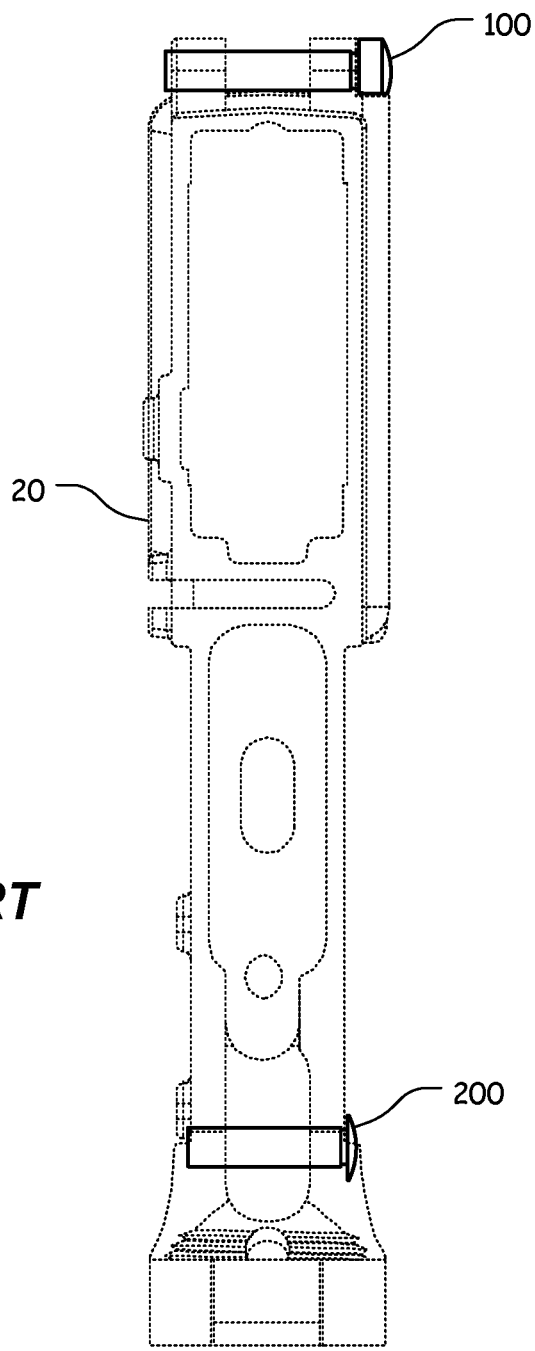
FIG. 4 illustrates a top view of a known take down pin and pivot pin positioned within a lower receiver.
Figure 5:
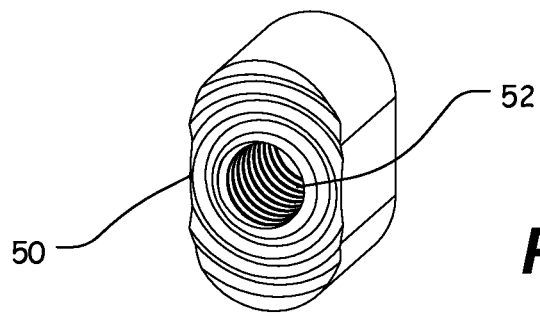
FIG. 5 illustrates a more detailed view of a known magazine release button for an AR-15 style firearm.
Figure 6:
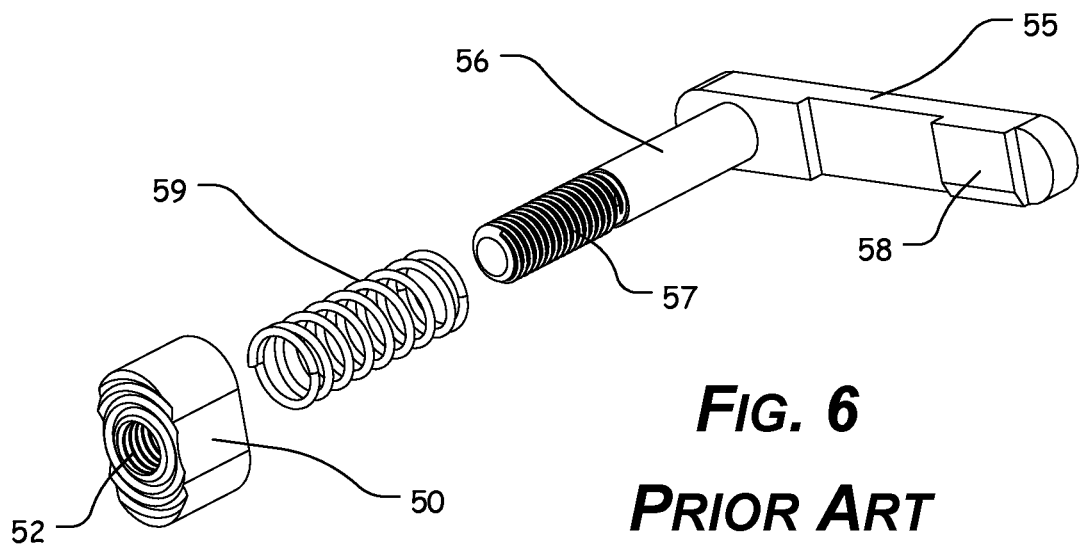
FIG. 6 illustrates a more detailed, exploded view of the components of the known magazine release and magazine release button.
Figure 7:
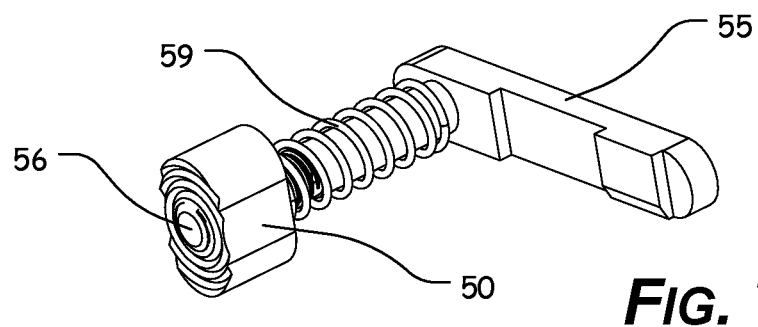
FIG. 7 illustrates a more detailed, assembled view of the components of the known magazine release and magazine release button.
Figure 8:
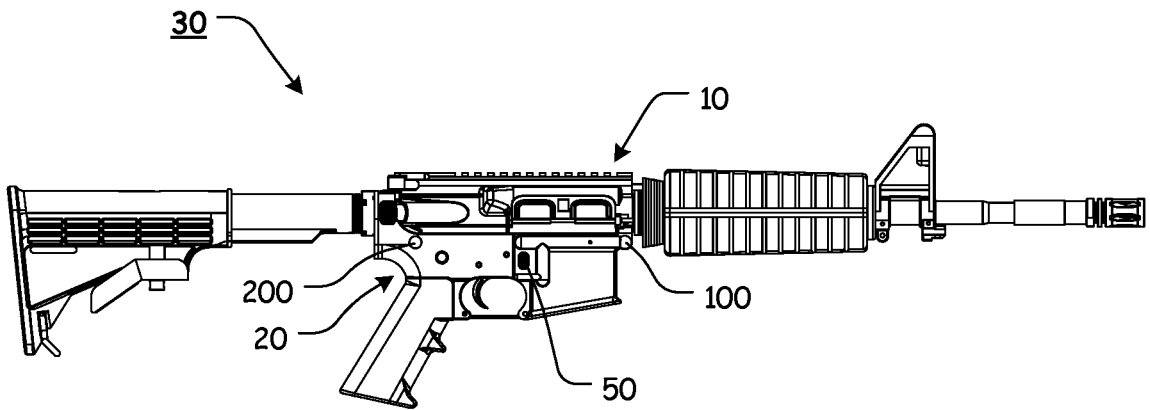
FIG. 8 illustrates a side view showing certain exemplary components of an AR-15 style firearm, wherein the upper receiver and the lower receiver are in an engaged or locked position.
Figure 9:
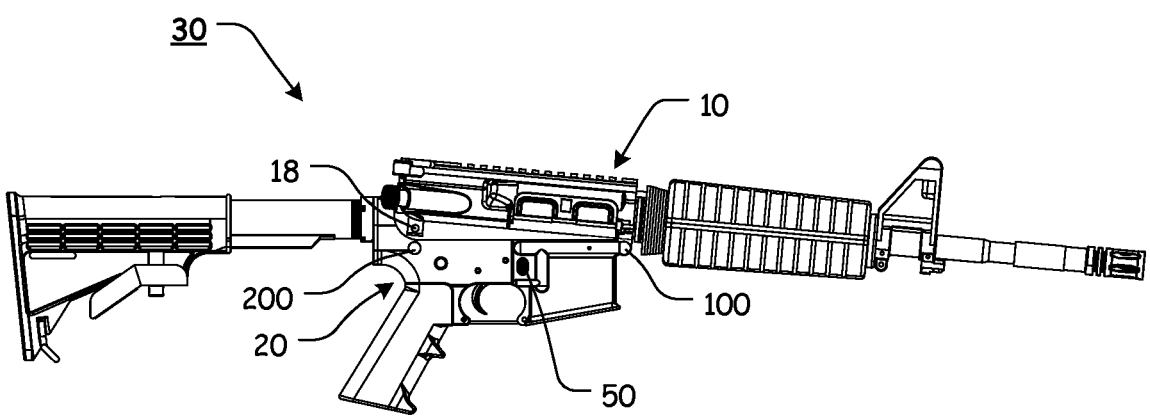
FIG. 9 illustrates a side view showing certain exemplary components of an AR-15 style firearm, wherein the upper receiver and the lower receiver are in a disengaged or unlocked position.
Figure 10A:
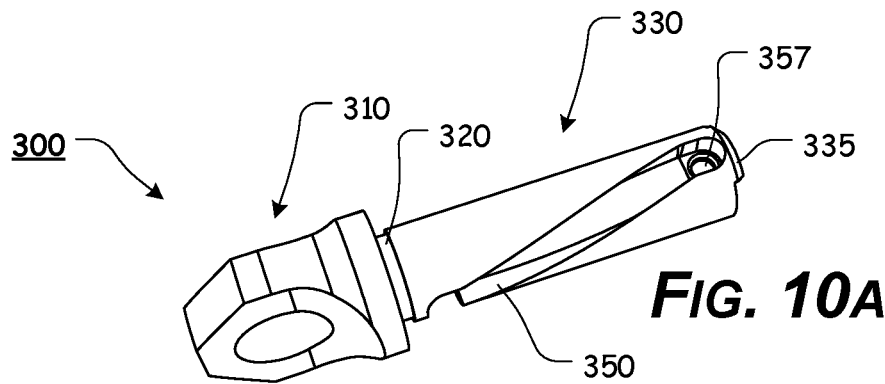
FIG. 10A illustrates an upper, front perspective view of an exemplary embodiment of a takedown pin, according to the present disclosure.
Figure 10B:
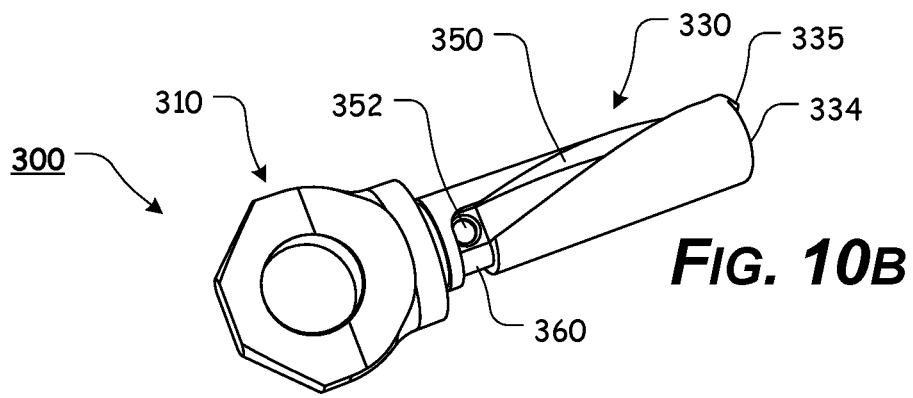
FIG. 10B illustrates an upper, front perspective view of an exemplary embodiment of a takedown pin in a rotated position, according to the present disclosure.
Figure 10C:
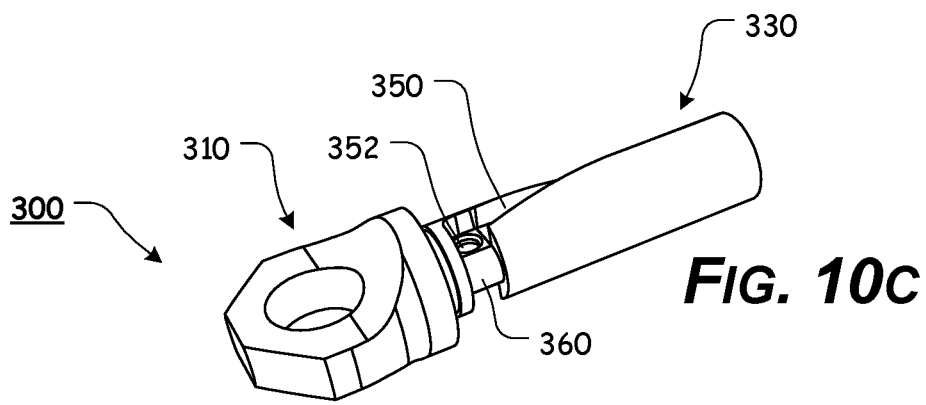
FIG. 10C illustrates an upper, front perspective view of an exemplary embodiment of a takedown pin in a rotated position, according to the present disclosure.
Figure 10D:
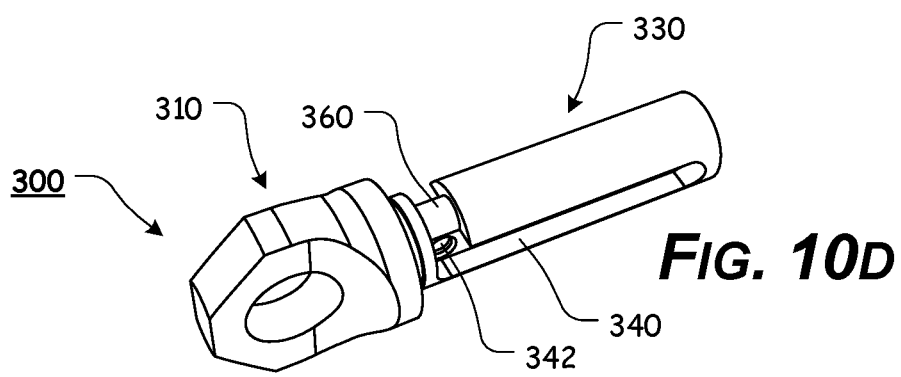
FIG. 10D illustrates an upper, front perspective view of an exemplary embodiment of a takedown pin in a rotated position, according to the present disclosure.
Figure 10E:
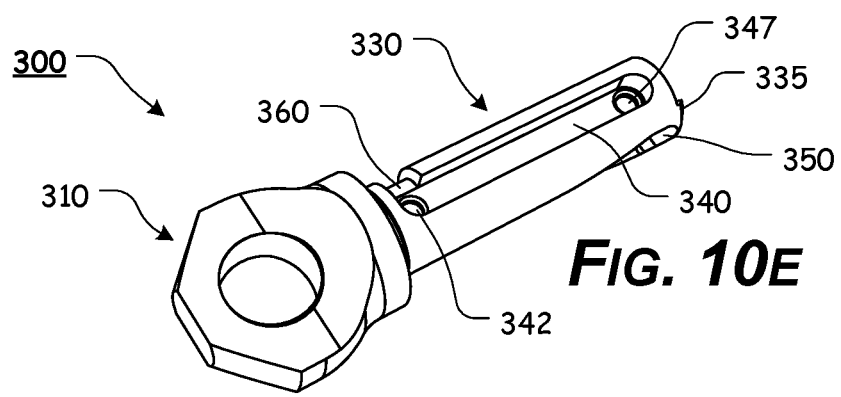
FIG. 10E illustrates an upper, front perspective view of an exemplary embodiment of a takedown pin in a rotated position, according to the present disclosure.
Figure 10F:
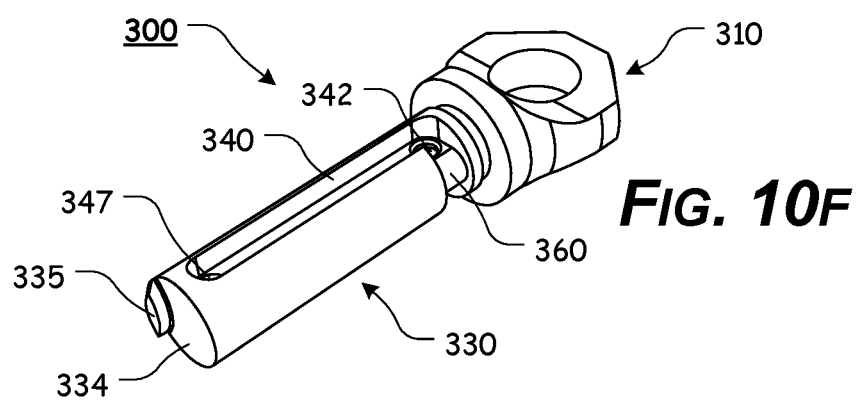
FIG. 10F illustrates an upper, rear perspective view of an exemplary embodiment of a takedown pin, according to the present disclosure.
Figure 10G:
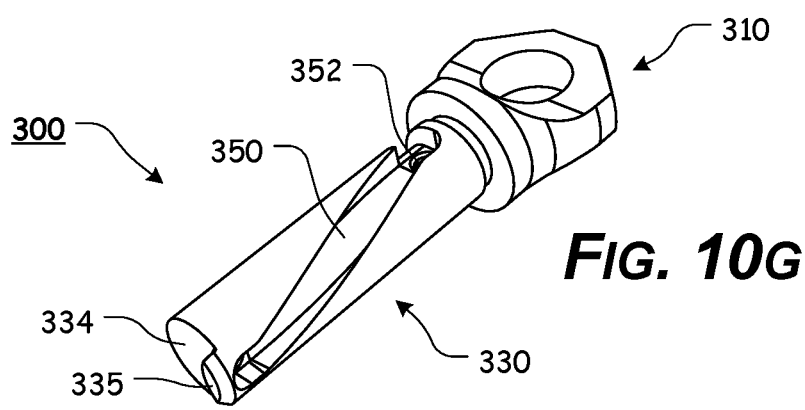
FIG. 10G illustrates an upper, rear perspective view of an exemplary embodiment of a takedown pin in a rotated position, according to the present disclosure.
Figures 10H, 10I:
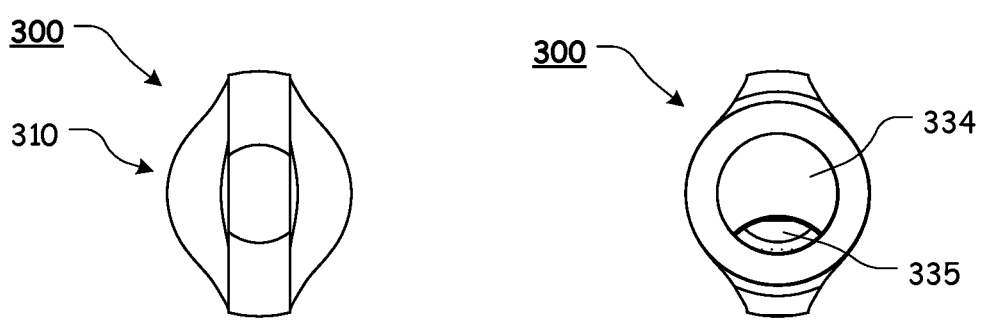
FIG. 10H illustrates a front view of an exemplary embodiment of a takedown pin, according to the present disclosure.
FIG. 10I illustrates a rear view of an exemplary embodiment of a takedown pin, according to the present disclosure.
Figure 11A:
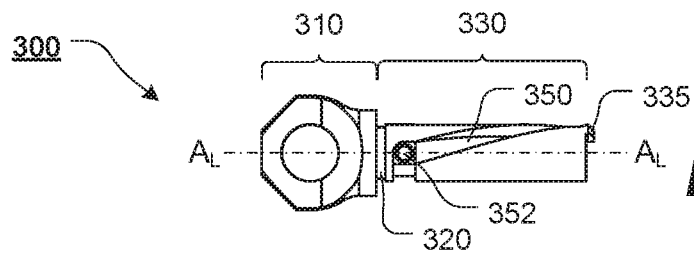
FIG. 11A illustrates a side view of an exemplary embodiment of a takedown pin, according to the present disclosure.
Figure 11B:
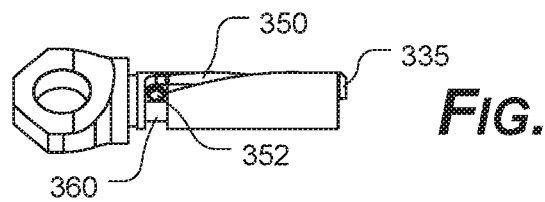
FIG. 11B illustrates a side view of an exemplary embodiment of a takedown pin in a rotated position, according to the present disclosure.
Figure 11C:
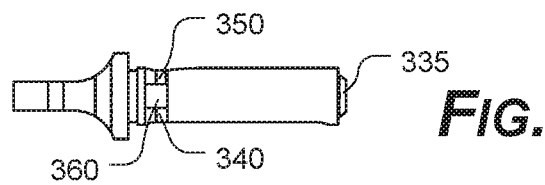
FIG. 11C illustrates a side view of an exemplary embodiment of a takedown pin in a rotated position, according to the present disclosure.
Figure 11D:
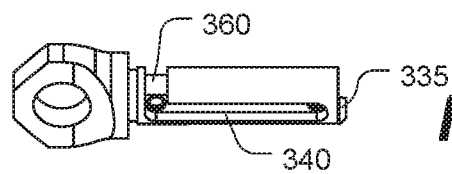
FIG. 11D illustrates a side view of an exemplary embodiment of a takedown pin in a rotated position, according to the present disclosure.
Figure 11E:
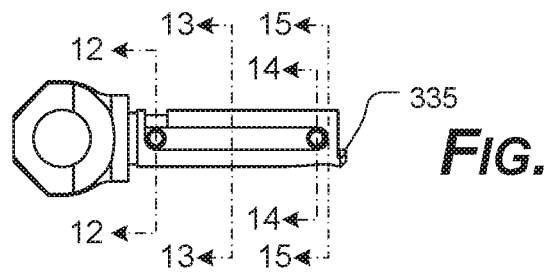
FIG. 11E illustrates a side view of an exemplary embodiment of a takedown pin in a rotated position, according to the present disclosure.
Figure 11F:
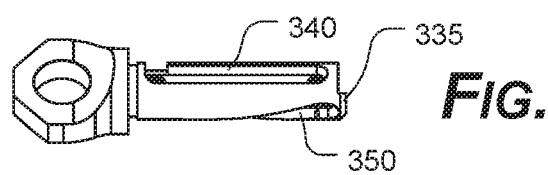
FIG. 11F illustrates an upper, rear perspective view of an exemplary embodiment of a takedown pin in a rotated position, according to the present disclosure.
Figure 11G:
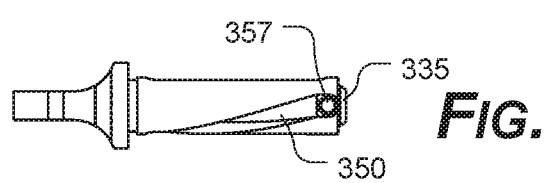
FIG. 11G illustrates an upper, rear perspective view of an exemplary embodiment of a takedown pin in a rotated position, according to the present disclosure.
Figure 11H:
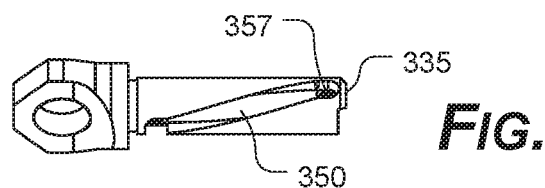
FIG. 11H illustrates a front view of an exemplary embodiment of a takedown pin, according to the present disclosure.
Figure 12:
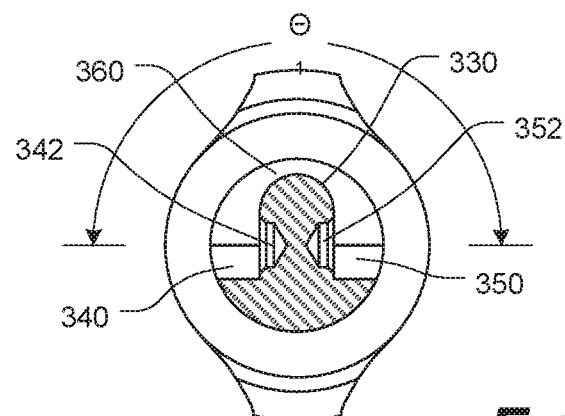
FIG. 12 illustrates a rear, cross-sectional view of an exemplary embodiment of a takedown pin, taken along line 12-12 of FIG. 11E, according to the present disclosure.
Figure 13:
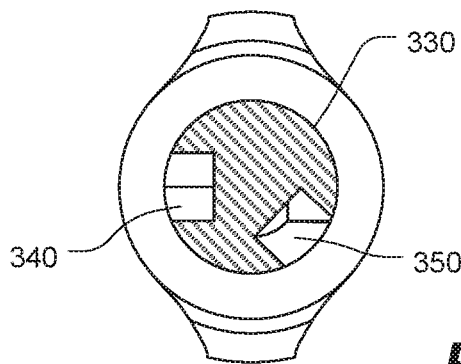
FIG. 13 illustrates a rear, cross-sectional view of an exemplary embodiment of a takedown pin, taken along line 13-13 of FIG. 11E, according to the present disclosure.
Figure 14:
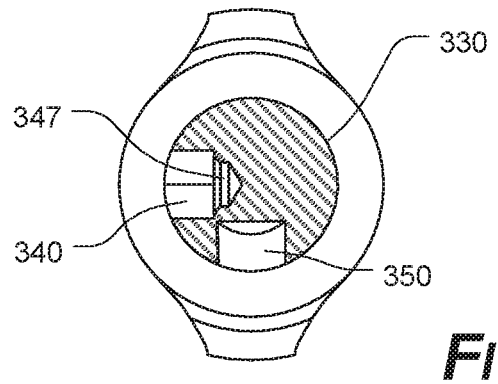
FIG. 14 illustrates a rear, cross-sectional view of an exemplary embodiment of a takedown pin, taken along line 14-14 of FIG. 11E, according to the present disclosure.
Figure 15:
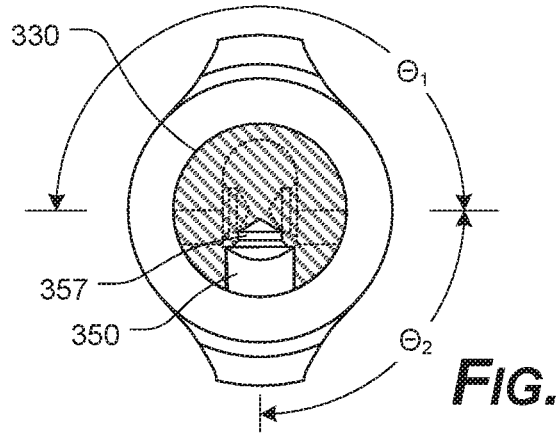
FIG. 15 illustrates a rear, cross-sectional view of an exemplary embodiment of a takedown pin, taken along line 15-15 of FIG. 11E, according to the present disclosure.

For simplicity and clarification, the design factors and operating principles of the takedown pin according to the present disclosure are explained with reference to various exemplary embodiments of a takedown pin according to the present disclosure. The basic explanation of the design factors and operating principles of the takedown pin is applicable for the understanding, design, and operation of the takedown pin of the present disclosure. It should be appreciated that the takedown pin can be adapted to many applications where a takedown pin can be used.

As used herein, the word "may" is meant to convey a permissive sense (i.e., meaning "having the potential to"), rather than a mandatory sense (i.e., meaning "must"). Unless stated otherwise, terms such as "first" and "second" are used to arbitrarily distinguish between the elements such terms describe. Thus, these terms are not necessarily intended to indicate temporal or other prioritization of such elements.

The term "coupled", as used herein, is defined as connected, although not necessarily directly, and not necessarily mechanically. The terms "a" and "an" are defined as one or more unless stated otherwise.

Throughout this application, the terms "comprise" (and any form of comprise, such as "comprises" and "comprising"), "have" (and any form of have, such as "has" and "having"), "include", (and any form of include, such as "includes" and "including") and "contain" (and any form of contain, such as "contains" and "containing") are used as open-ended linking verbs. It will be understood that these terms are meant to imply the inclusion of a stated element, integer, step, or group of elements, integers, or steps, but not the exclusion of any other element, integer, step, or group of elements, integers, or steps. As a result, a system, method, or apparatus that "comprises", "has", "includes", or "contains" one or more elements possesses those one or more elements but is not limited to possessing only those one or more elements. Similarly, a method or process that "comprises", "has", "includes" or "contains" one or more operations possesses those one or more operations but is not limited to possessing only those one or more operations.

It should also be appreciated that the terms "takedown pin", "upper receiver", "lower receiver", and "firearm" are used for basic explanation and understanding of the operation of the systems, methods, and apparatuses of the present disclosure. Therefore, the terms "takedown pin", "upper receiver", "lower receiver", and "firearm" are not to be construed as limiting the systems, methods, and apparatuses of the present disclosure.

For simplicity and clarification, the takedown pin of the present disclosure will be described as being used in conjunction with a firearm, such as an AR-15 or M4 style rifle or carbine. However, it should be appreciated that these are merely exemplary embodiments of the takedown pin and are not to be construed as limiting the present disclosure. Thus, the takedown pin of the present disclosure may be utilized in conjunction with any appropriate firearm, object, or device.

Turning now to the drawing Figs., as discussed above, FIGS. 1-9 illustrate certain elements and/or aspects of a known AR-15 or M4 style rifle or carbine.

FIGS. 10-22 illustrate certain elements and/or aspects of an exemplary embodiment of the takedown pin 300, according to the present disclosure. In illustrative, non-limiting embodiment(s) of the present disclosure, as illustrated in FIGS. 16-22, the exemplary embodiments of the takedown pin 300 are utilized in conjunction with an upper receiver 10, a lower receiver 20, and/or firearm 30. As illustrated, the upper receiver 10, lower receiver 20, and/or firearm 30 most closely resemble an AR-15 or M4 style platform. However, it should be understood and appreciated that the upper receiver 10, lower receiver 20, and/or firearm 30 are not so limited and the takedown pin 300 of the present disclosure can be utilized in connection with any AR-15 or M4 style platform or any other firearm or platform, such as, for example, a FAL or SCAR style firearm, or any other firearm or platform having a pivotably or hingedly connected upper and lower element or component.

With that understanding, the firearm 30, as illustrated in FIGS. 16-22, comprises an upper receiver 10 and a lower receiver 20. The upper receiver 10 and the lower receiver 20 comprise at least some of an upper pivot pin lug aperture 12, an upper takedown lug aperture 18, lower pivot pin lug apertures 22, lower takedown lug apertures 28, a pivot pin 100, a takedown pin 200, a magazine release button 50 that travels back and forth within at least a portion of a magazine release button receiving cavity. The magazine release button 50 includes at least some of an internal aperture 52, a magazine release spring 59, a magazine release 55, a magazine release connection shaft 56, a threaded portion 57, and a magazine engagement projection 58.

It should be appreciated that each of these elements (as well as other, similarly named elements of the upper receiver 10 and the lower receiver 20) correspond to and operate similarly to similarly named elements, as described herein with reference to the elements of the upper receiver 10 and a lower receiver 20 of FIGS. 1-9. Thus, it should be appreciated that the upper receiver 10 and the lower receiver 20 may incorporate one or any of the features or elements of the upper receiver 10 and a lower receiver 20 of FIGS. 1-9.

FIGS. 10A-22 illustrate an exemplary embodiment of a takedown pin 300. In various exemplary, nonlimiting embodiments, the takedown pin 300 comprises a head 310 and a shank 330. In various exemplary embodiments, the shank 330 comprises an elongate, cylindrical shank portion that extends from the head 310 to a terminal surface 334. In some embodiments, an intermediate portion 320, having a reduced diameter when compared to a diameter of the shank 330, is formed or disposed between the shank 330 and the head 310.

The head 310 extends from the shank 330 or the intermediate portion 320 and is generally formed so as to allow a user to grasp and slide or rotate the takedown pin 300. In various exemplary embodiments, at least a portion of the head 310 is textured to provide greater purchase on at least a portion of the head 310 of the takedown pin 300. At least a portion of the head 310 may be textured using, for example, stippling, knurling, checkering, annular rings, or other patterns. Providing texture to a portion of the head 310 can aid in transitioning the takedown pin 300 between an engaged or locked position, a partially engaged or inoperably locked position, and/or a disengaged or unlocked position.

In various exemplary, nonlimiting embodiments, the overall length of the shank 330, along its longitudinal axis, $A_L$, from the head 310 to the terminal surface 334, is similar to the overall length of the shank of a known takedown pin 10. Similarly, an outer diameter of at least a portion of the shank 330 is similar to the overall outer diameter of the shank of a known takedown pin 10.

Thus, the shank 330 of the takedown pin 300 is formed so as to be appropriately inserted within and be repeatably slidable within the upper takedown pin aperture 18 of an upper receiver 10 and the lower takedown pin apertures 28 of a lower receiver 20. Thus. It should be appreciated that the length and the overall outer diameter of the shank 330 are designed choices based upon the firearm or other device with which the takedown pin 300 is to be utilized.

A projection 335 extends from at least a portion of the terminal surface 334 of the takedown pin 300.

A first groove or slot 340 is formed in the shank 330. In various exemplary, nonlimiting embodiments, the first groove or slot 340 defines a continuous, elongate, linear first groove or slot 340. The first groove or slot 340 extends, within the shank 330, along the longitudinal axis $A_L$ of the takedown pin 300.

The first groove or slot 340 can be used to limit the rotational movement (range of rotation) and the longitudinal movement (movement along the longitudinal axis, $A_L$) of the takedown pin 300, relative to the lower receiver 20. In various exemplary embodiments, the first groove or slot 340 comprises a linear slot, which can be used to limit the rotational movement (range of rotation) of the takedown pin 300 to 0°. Thus, when the takedown pin 300 is appropriately positioned within a lower receiver 20, the detent pin 41 is positioned at least partially within the first groove or slot 340. The detent pin 41 interacts with the first groove or slot 340, so that the takedown pin 300 can be repeatedly urged (along the longitudinal axis, $A_L$) between the engaged or locked position, as illustrated in FIG. 16, and the partially engaged or inoperably locked position, as illustrated in FIGS. 17-19.

A first detent recess 342 is formed proximate a first end of the first groove or slot 340 and a second detent recess 347 is formed proximate a second end of the first groove or slot 340. The first detent recess 342 is associated with the engaged or locked position and the second detent recess 347 is associated with the partially engaged or inoperably locked position.

Figure 16:
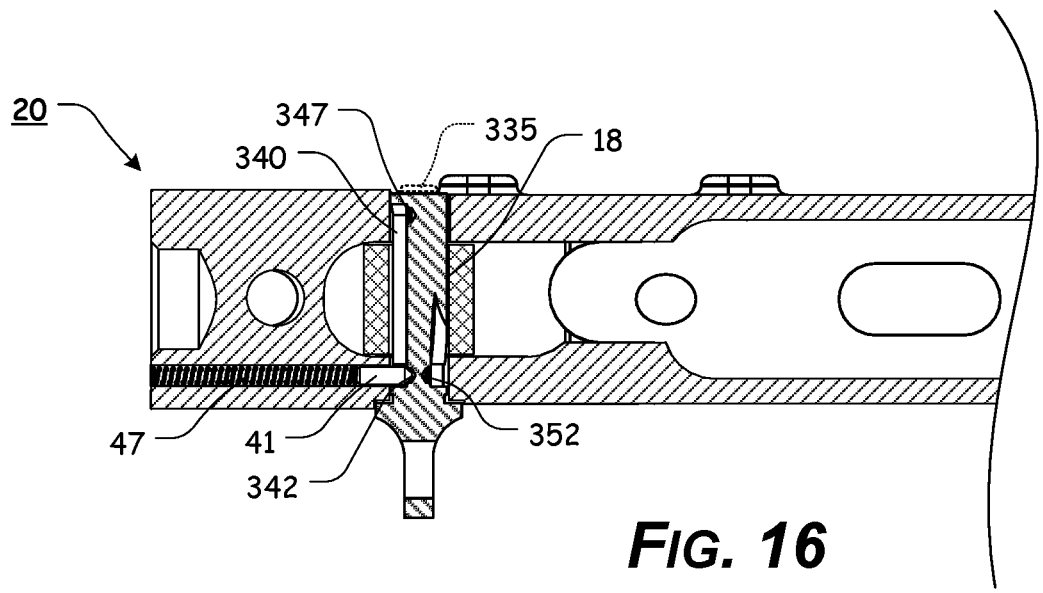
FIG. 16 illustrates a top, cross-sectional view of an exemplary upper receiver and an exemplary embodiment of a takedown pin, wherein the takedown pin is in an engaged or locked position (with the detent pin in the first groove or slot), according to the present disclosure.
Figure 17:
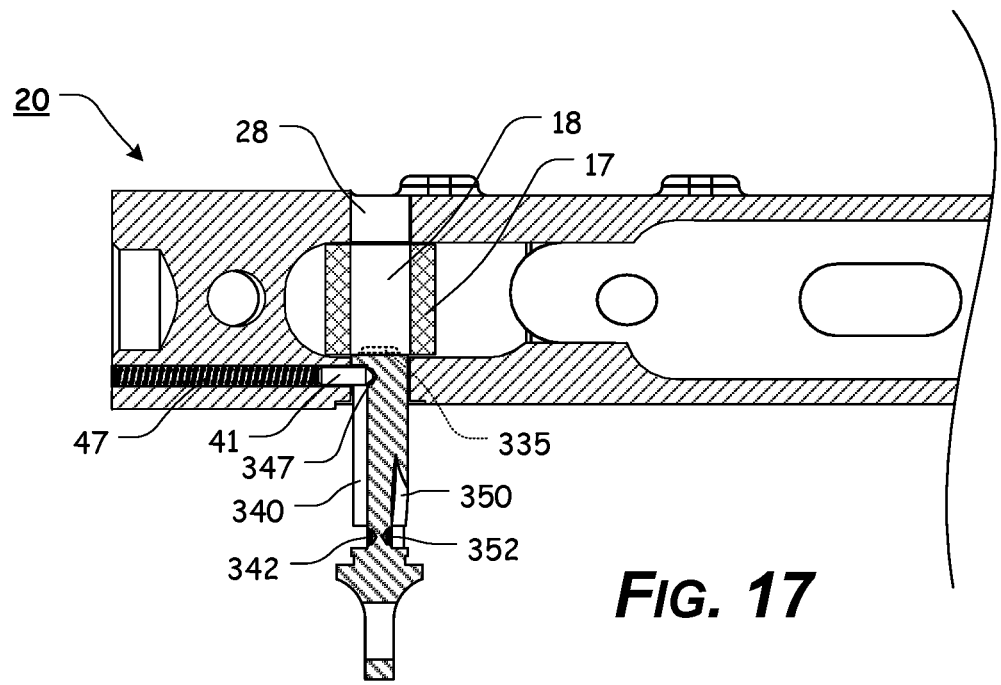
FIG. 17 illustrates a top, cross-sectional view of an exemplary upper receiver and an exemplary embodiment of a takedown pin, wherein the takedown pin is in a partially engaged or inoperably locked position, according to the present disclosure.
Figure 18:
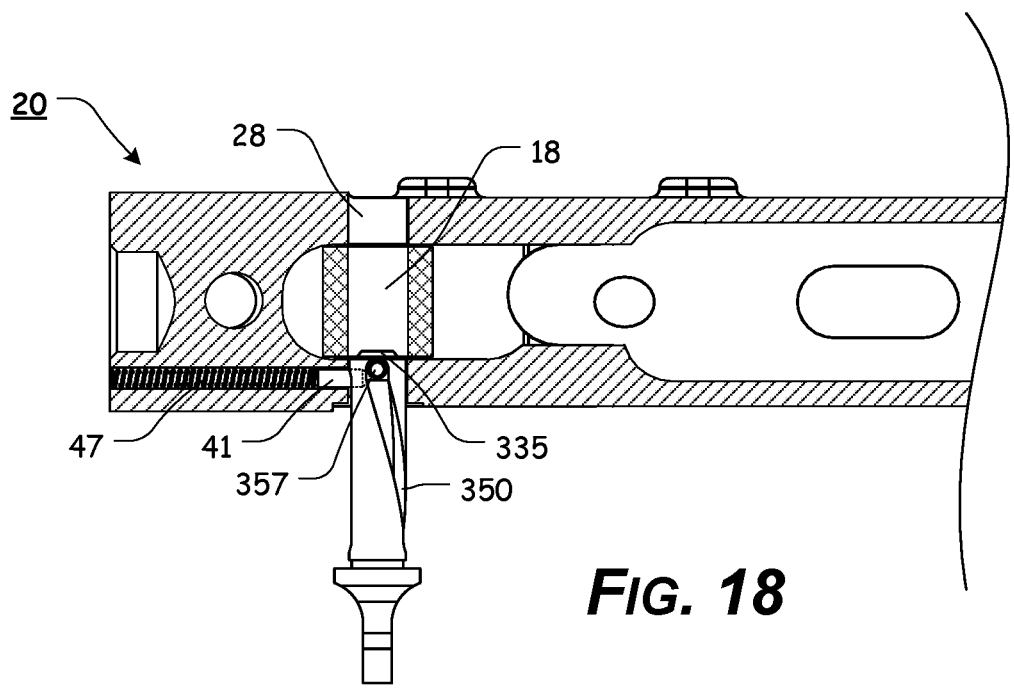
FIG. 18 illustrates a top, cross-sectional view of an exemplary upper receiver and a non-cross-sectional view of an exemplary embodiment of a takedown pin, wherein the takedown pin is in a partially engaged or inoperably locked position, according to the present disclosure.
Figure 19:
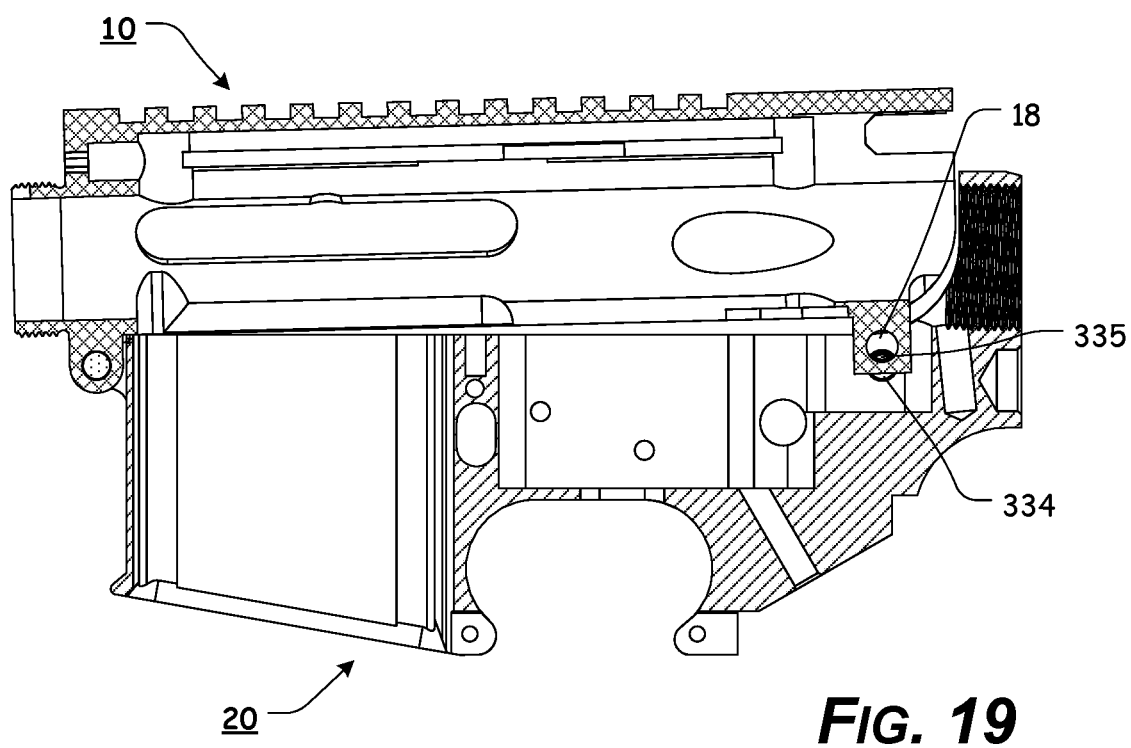
FIG. 19 illustrates a left, side, cross-sectional view of an exemplary upper receiver and an exemplary embodiment of a takedown pin, wherein the takedown pin is in a partially engaged or inoperably locked position, according to the present disclosure.

While interaction between the first groove or slot 340 and the detent pin 41 can be used to define or limit the range of rotation and longitudinal movement of the takedown pin 300, the first detent recess 342 and the second detent recess 347 are formed so as to be engaged by the detent pin 41 at the engaged or locked position, as illustrated in FIG. 16 and at the partially engaged or inoperably locked position, as illustrated in FIGS. 17-19. A detent spring 47 provides a spring biasing force that urges the detent pin 41 into the first groove or slot 340. Thus, once the detent pin 41 engages the first groove or slot 340, the takedown pin 300 is slidably movable between engaged or locked position and the partially engaged or inoperably locked position, but additional frictional engagement is provided between the detent pin 41 and the first detent recess 342 and the second detent recess 347 to further secure the takedown pin 300 in either the engaged or locked position or the partially engaged or inoperably locked position. Thus, the first detent recess 342 and the second detent recess 347 act as mechanical stops, within or proximate terminating positions of the first groove or slot 340, to limit the movement of the takedown pin 300.

A second groove or slot 350 is also formed in the shank 330. In various exemplary, nonlimiting embodiments, the second groove or slot 350 defines a continuous, curved, recurved, arcuate, or partially arcuate second groove or slot 350. A first detent recess 352 is formed proximate a first end of the second groove or slot 350 and a second detent recess 357 is formed proximate a second end of the second groove or slot 350. The second groove or slot 350 can be used to limit the rotational movement (range of rotation) and the longitudinal movement (movement along the longitudinal axis, $A_L$) of the takedown pin 300, relative to the lower receiver 20.

The second groove or slot 350 is formed so as to allow the takedown pin 300 to traverse or pass through a desired range of rotation, as the takedown pin 300 is rotated or manipulated to slide within at least one of the lower takedown pin apertures 28 of a lower receiver 20, relative to the takedown pin detent pin 41 of the lower receiver 20. The degree of curve or arc of the second groove or slot 350 is based on the desired range of rotation of the takedown pin 300 over the length of the shank 330 or the second groove or slot 350. For example, as illustrated, if the takedown pin 300 is configured to travel over a range of 90° of rotation from the engaged or locked position to the disengaged or unlocked position, the second groove or slot 350 is configured to allow the takedown pin 300 to rotate 90°.

Figure 20:
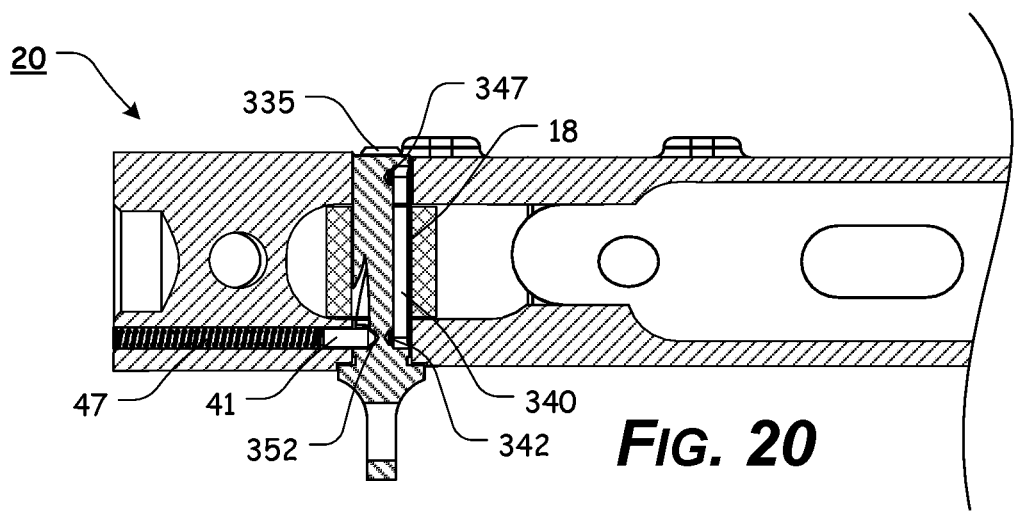
FIG. 20 illustrates a top, cross-sectional view of an exemplary upper receiver and a non-cross-sectional view of an exemplary embodiment of a takedown pin, wherein the takedown pin is in an engaged or locked position (with the detent pin in the second groove or slot), according to the present disclosure.
Figure 22:
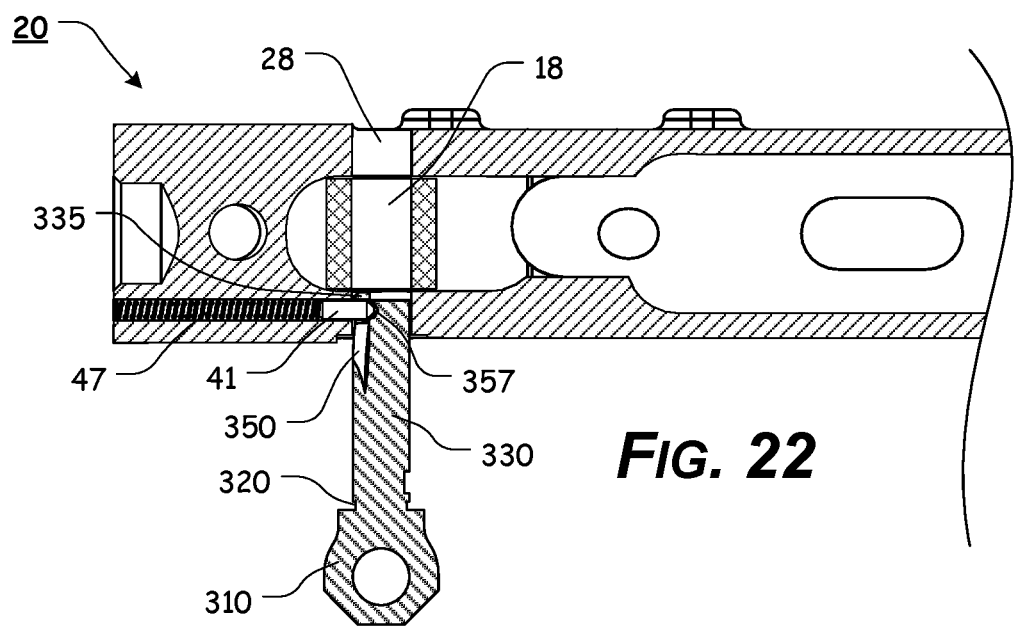
FIG. 22 illustrates a top, cross-sectional view of an exemplary upper receiver and an exemplary embodiment of a takedown pin, wherein the takedown pin is in a disengaged or unlocked position, according to the present disclosure.

It should be appreciated that the desired range of rotation of the takedown pin 300 is a design choice based upon the amount of rotation desired to effect the transition of the takedown pin 300 from the engaged or locked position, as illustrated in FIG. 20, to the disengaged or unlocked position, as illustrated in FIG. 22. Thus, in various exemplary embodiments, as illustrated most clearly in FIG. 15, the desired range of rotation, $\Theta2$, is 90°. In certain other exemplary embodiments, the desired degree of rotation may optionally be between 0° and 90°. In still other exemplary embodiments, the desired degree of rotation may optionally be greater than 90°.

Thus, when the takedown pin 300 is appropriately positioned within a lower receiver 20, the detent pin 41 is positioned at least partially within the second groove or slot 350. When the detent pin 41 is positioned at least partially within the second groove or slot 350, the detent pin 41 interacts with the second groove or slot 350, so that the takedown pin 300 can be rotatedly transitioned between the engaged or locked position, as illustrated in FIG. 20 and the disengaged or unlocked position, as illustrated in FIG. 22.

Figure 21:
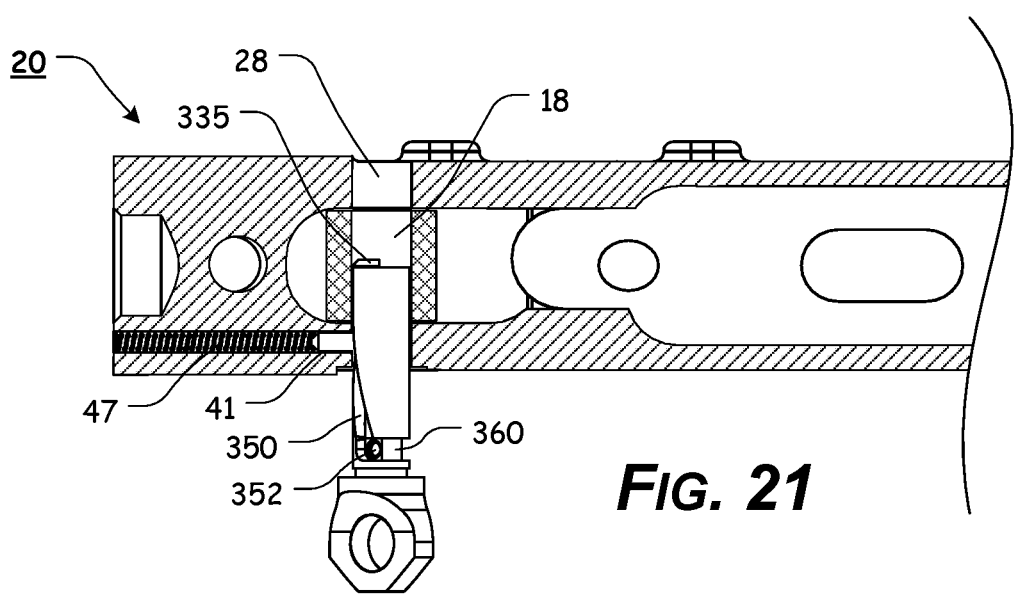
FIG. 21 illustrates a top, cross-sectional view of an exemplary upper receiver and an exemplary embodiment of a takedown pin, wherein the takedown pin is in a partially rotated position, according to the present disclosure.

FIG. 21 illustrates an intermediate position, as the takedown pin 300 is rotatably transitioned between the engaged or locked position and the disengaged or unlocked position.

While interaction between the second groove or slot 350 and the detent pin 41 can be used to define or limit the range of rotation and longitudinal movement of the takedown pin 300, the first detent recess 352 and the second detent recess 357 are formed so as to be engaged by the detent pin 41 at the engaged or locked position, as illustrated in FIG. 20 and at the disengaged or unlocked position, as illustrated in FIG. 22. They detent spring 47 provides a spring biasing force that urges the detent pin 41 into the second groove or slot 350. Thus, once the detent pin 41 engages the second groove or slot 350, the takedown pin 300 is slidably rotatable between engaged or locked position and the disengaged an unlocked position, but additional frictional engagement is provided between the detent pin 41 and the first detent recess 352 and the second detent recess 357 to further secure the takedown pin 300 in either the engaged or locked position or the disengaged or unlocked position. Thus, the first detent recess 352 and the second detent recess 357 act as mechanical stops, within or proximate terminating positions of the second groove or slot 350, to limit the movement of the takedown pin 300.

In certain exemplary, nonlimiting embodiments, the first detent recess 342 and the first detent recess 352 are the same recess and both the first groove or slot 340 and the second groove or slot 350 extend from the same first detent recess.

In certain exemplary, nonlimiting embodiments, the first detent recess 342 (and the first end of the first groove or slot 340) is positioned at a spaced apart location from the second detent recess 352 (and the first end of the second groove or slot 350). For example, as illustrated, the first detent recess 342 (and the first end of the first groove or slot 340) is positioned 180° (as illustrated by $\Theta1$ in FIGS. 12 and 15) around the shank 330 from the second detent recess 352 (and the first end of the second groove or slot 350). In these exemplary embodiments, a connecting groove or slot 360 is formed between the first end of the first groove or slot 340 and the first end of the second groove or slot 350. The connecting groove or slot 360 is formed so that the takedown pin 300 can be rotated such that the detent pin 41 engages at least a portion of the connecting groove or slot 360 to transition between the first end of the first groove or slot 340 and the first end of the second groove or slot 350.

The first detent recess 342 is formed proximate a first end of the connecting groove or slot 360 and the first detent recess 352 is formed proximate a second end of the connecting groove or slot 360.

As illustrated most clearly in FIGS. 16-22, the upper receiver 10 and the lower receiver 20 are pivotably attached or coupled, via the pivot pin. When the upper receiver 10 and the lower receiver 20 are attached or coupled in an operable configuration, the upper takedown pin lug aperture 18 is aligned between the lower takedown pin lug apertures 28. When the upper takedown pin lug aperture 18 is not aligned between the lower takedown pin lug apertures 28, the upper receiver 10 and the lower receiver 20 may still be attached or coupled, via the pivot pin, but are not in an operable configuration.

When the takedown pin 300 is appropriately positioned within the lower takedown pin lug aperture(s) 28 of the lower receiver 20, the detent pin 41 may be positioned at least partially within the first groove or slot 340. When the detent pin 41 is positioned at least partially within the first groove or slot 340, the detent pin 41 interacts with the first groove or slot 340, so that the takedown pin 300 can be repeatedly urged (along the longitudinal axis, $A_L$) between the engaged or locked position, as illustrated in FIG. 16, and the partially engaged or inoperably locked position, as illustrated in FIGS. 17-19.

When the takedown pin 300 is in the engaged or locked position (typically with the detent pin 41 at least partially seated within the second detent recess 347), at least a portion of the takedown pin 300 maintains the upper takedown pin lug aperture 18 in locked alignment between the lower takedown pin lug apertures 28, thus maintaining the upper receiver 10 and the lower receiver 20 in an operable configuration.

If the takedown pin 300 is urged, along its longitudinal axis, $A_L$, to the partially engaged or inoperably locked position (typically with the detent pin 41 at least partially seated within the first detent recess 342), the shank 330 is withdrawn a sufficient distance to from the upper takedown pin lug aperture 18 that the terminal surface 334 is withdrawn from the upper takedown pin lug aperture 18. However, in the partially engaged or inoperably locked position, at least a portion of the projection 335 extends into the upper takedown pin lug aperture 18. By maintaining at least a portion of the projection 335 in the upper takedown pin lug aperture 18, the upper receiver 10 is able to be pivoted, via the pivot pin, to an inoperable position, relative to the lower receiver 20. Because at least a portion of the projection 335 is maintained within at least a portion of the upper takedown pin lug aperture 18, the upper receiver 10 is not able to pivot freely, relative to the lower receiver 20, but is only able to pivot between the engaged or locked position and the partially engaged or inoperably locked position.

In various exemplary embodiments, the projection 335 includes an arcuate or semicircular surface, which corresponds to a portion of the article or curve of the upper takedown pin lug aperture 18. However, in certain exemplary embodiments, the projection 335 includes an alternative surface or profile. In still other exemplary embodiments, the projection 335 comprises a pin or other protrusion that extends from the terminal surface 334 of the shank 330. The projection 335 only extends from a sufficient portion of the terminal surface 334 so as to interact with the upper takedown pin lug aperture 18 to allow the upper receiver 10 to pivot to the partially engaged or inoperably locked position.

When the takedown pin 300 is in the engaged or locked position, the takedown pin 300 can be rotated, via interaction between the detent pin 41 and the connecting channel 360, between the first detent recess 342 and the first detent recess 352. This allows the detent pin 41 to be rotated between the first groove or slot 340 and the second groove or slot 350.

When the detent pin 41 is positioned at least partially within the second groove or slot 350, the detent pin 41 interacts with the second groove or slot 350, so that the takedown pin 300 can be repeatedly, rotationally urged between the engaged or locked position, as illustrated in FIG. 20, and the disengaged or unlocked position, as illustrated in FIG. 22.

When the takedown pin 300 is in the disengaged or unlocked (typically with the detent pin 41 at least partially seated within the second detent recess 357), the shank 330 and projection 335 are withdrawn a sufficient distance to from the upper takedown pin lug aperture 18 that the terminal surface 334 and through at least a portion of the projection 335 are withdrawn from the upper takedown pin lug aperture 18. By withdrawing the shank 330 and through at least a portion of the projection 335 from the upper takedown pin lug aperture 18, the upper receiver 10 is able to be freely pivoted, via the pivot pin, relative to the lower receiver 20.

Figure 23A:
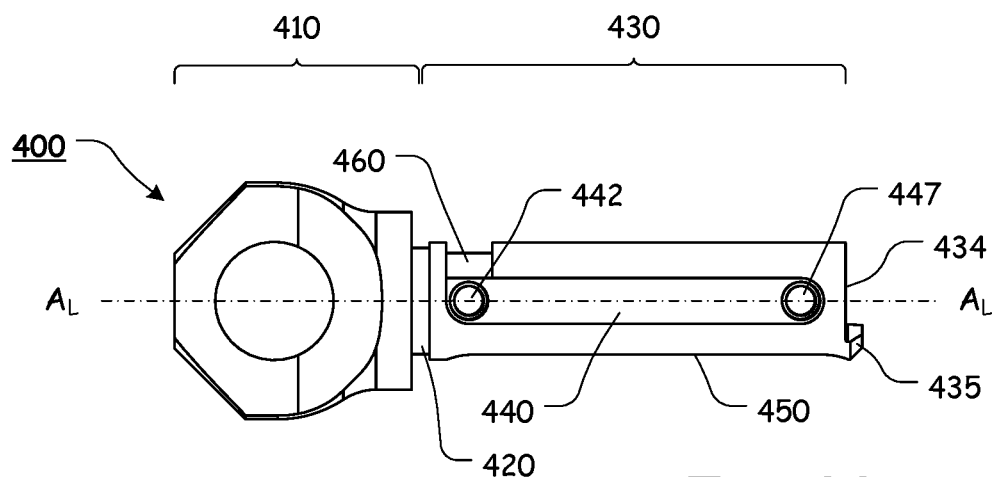
FIG. 23A illustrates a side view of an exemplary embodiment of a takedown pin, according to the present disclosure.
Figure 23B:
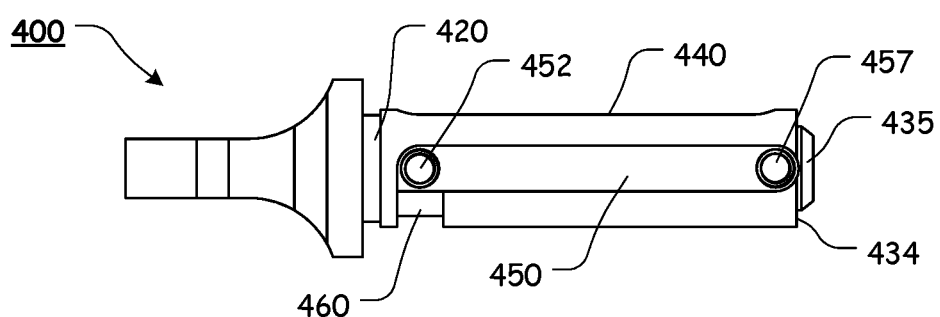
FIG. 23B illustrates a side view of an exemplary embodiment of a takedown pin in a rotated position, according to the present disclosure.

FIGS. 23A-23B illustrate certain elements or components of an exemplary embodiment of a takedown pin 400. In various exemplary, nonlimiting embodiments, the takedown pin 400 comprises at least some of a head 410, a shank 430 extending from the head 410 to a terminal surface 434, an optional intermediate portion 420, a projection 435, a first groove or slot 440 having an associated first detent recess 442 and second detent recess 447, a second groove or slot 450 having an associated first detent recess 452 and second detent recess 457, and a connecting groove or slot 460.

It should be appreciated that these elements correspond to and are substantially similar in form and/or function to the head 310, the shank 330 extending from the head 310 to the terminal surface 334, the optional intermediate portion 320, the projection 335, the first groove or slot 340 having the associated first detent recess 342 and second detent recess 347, the second groove or slot 350 having the associated first detent recess 352 and second detent recess 357, and the connecting groove or slot 360, as described herein.

However, as illustrated in FIGS. 23A-23B, in certain illustrative, non-limiting embodiment(s) of the present disclosure, the second groove or slot 450 is not curved or arcuate, but is linear or substantially linear. Thus, when a detent pin 41 is positioned within the second groove or slot 450, a rotational force is not necessary to manipulate the takedown pin 400 between the engaged or locked position and the disengaged or unlocked position.

Figure 24A:
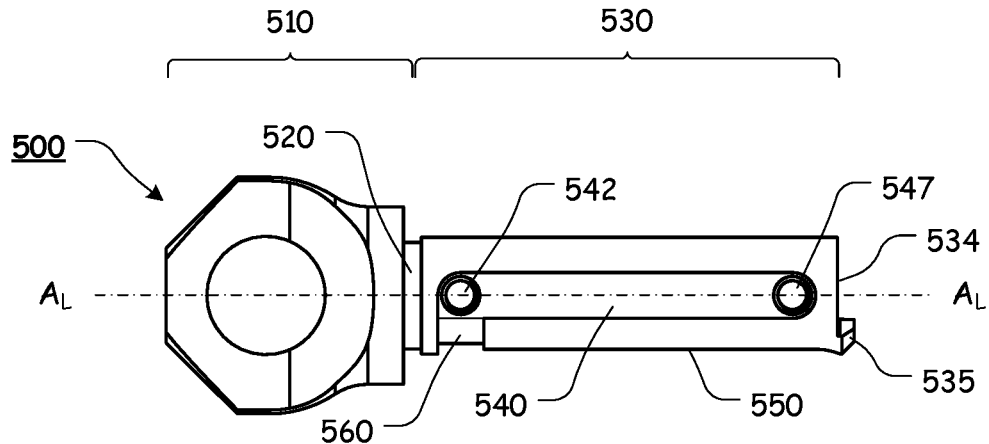
FIG. 24A illustrates a side view of an exemplary embodiment of a takedown pin, according to the present disclosure.
Figure 24B:
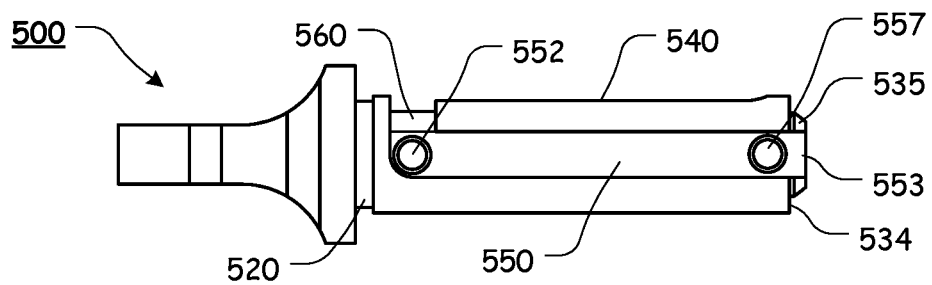
FIG. 24B illustrates a side view of an exemplary embodiment of a takedown pin in a rotated position, according to the present disclosure
Figure 24C:
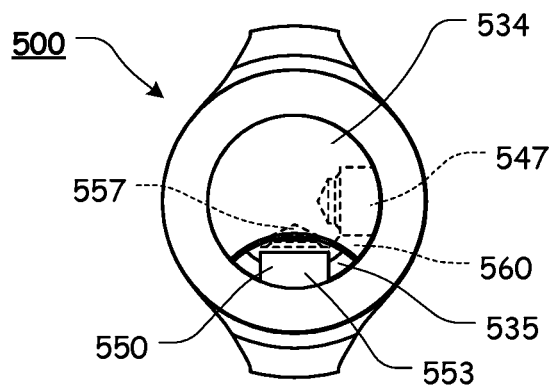
FIG. 24C illustrates a rear view of an exemplary embodiment of a takedown pin, according to the present disclosure.

FIGS. 24A-24B illustrate certain elements or components of an exemplary embodiment of a takedown pin 500. In various exemplary, nonlimiting embodiments, the takedown pin 500 comprises at least some of a head 510, a shank 530 extending from the head 510 to a terminal surface 534, an optional intermediate portion 520, a projection 535, a first groove or slot 540 having an associated first detent recess 542 and second detent recess 547, a second groove or slot 550 having an associated first detent recess 552 and second detent recess 557, and a connecting groove or slot 560.

It should be appreciated that these elements correspond to and are substantially similar in form and/or function to the head 410, the shank 430 extending from the head 410 to the terminal surface 434, the optional intermediate portion 420, the projection 435, the first groove or slot 440 having the associated first detent recess 442 and second detent recess 447, the second groove or slot 450 having the associated first detent recess 452 and second detent recess 457, and the connecting groove or slot 460, as described herein.

However, as illustrated in FIGS. 24A-24B, in certain illustrative, non-limiting embodiment(s) of the present disclosure, the second groove or slot 550 is not closed or bounded on both ends. Instead, the second groove or slot 550 extends to an open or at least partially open end 553. The open or at least partially open end 553 extends through the terminal surface 534 of the shank 530 and through at least a portion of the projection 535.

In various exemplary embodiments, at least a portion of the open or at least partially open end 553 includes a ramped surface portion. The ramped surface portion may extend toward the outer surface of the takedown pin 500 or extend away from the outer surface of the takedown pin 500, as the open or at least partially open end 553 extends toward the terminal surface 534 of the shank 530.

By extending the second groove or slot 550 to an open or at least partially open end 553, the takedown pin 500 can be more easily installed in or removed from a lower receiver 20 of a firearm 30. For example, during installation of the takedown pin 500, the open or at least partially open end 553 can be aligned with a detent pin 41, so as to allow a portion of the detent pin 41 to initially enter the second groove or slot 550, through the open or at least partially open end 553. Then, as the shank 530 is further urged into the lower receiver 20, a portion of the detent pin 41 is maintained within the second groove or slot 550.

In various exemplary embodiments, as described herein, the open or at least partially open end 553 extends through the terminal surface 534 of the shank 530 and through at least a portion of the projection 535. In these exemplary embodiments, the projection 535 can be utilized to assist in orienting the detent pin 41 within the second groove or slot 550 and initially overcoming the spring bias that the detent pin spring 47 provides to the detent pin 41.

During potential removal of the takedown pin 500, a sufficient withdrawing force can be applied to the takedown pin 500, such that the detent pin 41 is removed from the second detent recess 557 (if included) sufficient to allow at least a portion of the detent pin 41 to travel to the open or at least partially open end 553 and be removed from the second groove or slot 550 and the takedown pin 500.

In this manner, the takedown pin 500 may optionally be installed or removed from the lower receiver 20 in a non-traditional manner, without requiring removal of the castle nut, buffer tube, and receiver end plate from the lower receiver 20.

Figure 25A:
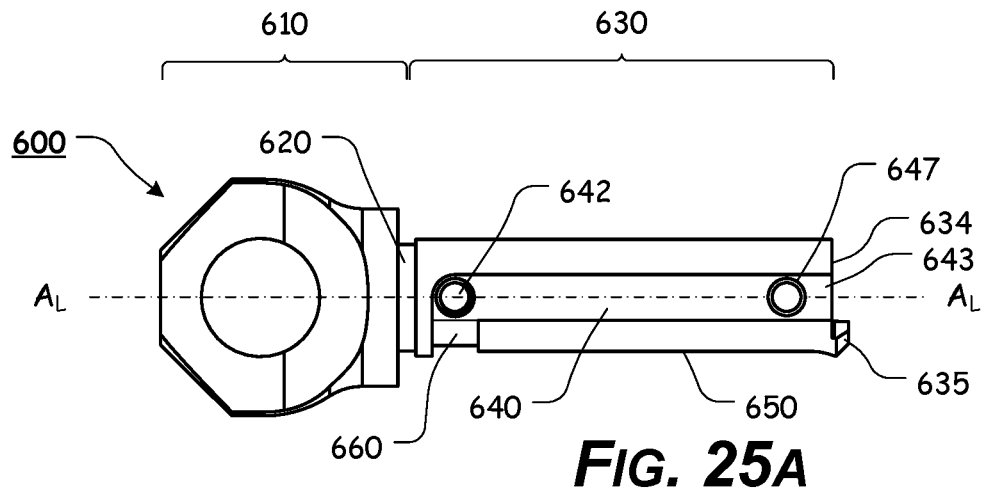
FIG. 25A illustrates a side view of an exemplary embodiment of a takedown pin, according to the present disclosure.
Figure 25B:
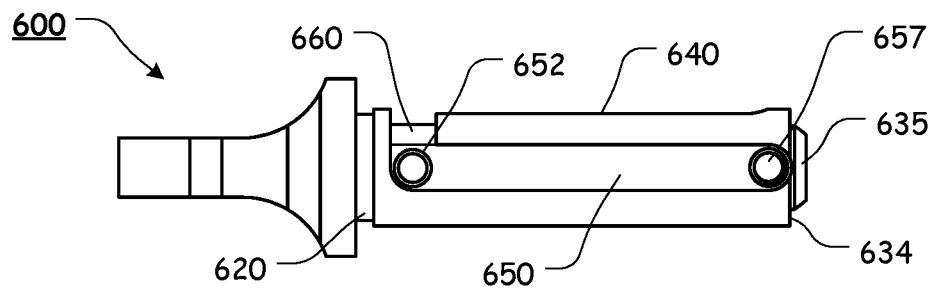
FIG. 25B illustrates a side view of an exemplary embodiment of a takedown pin in a rotated position, according to the present disclosure
Figure 25C:
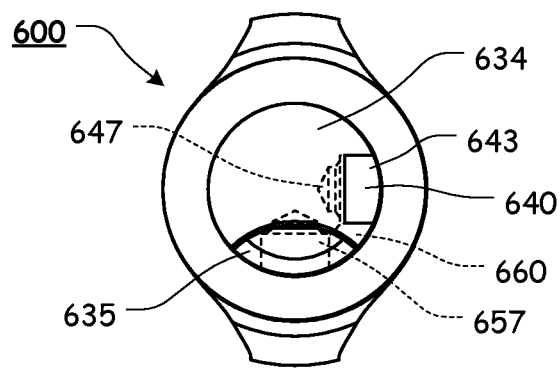
FIG. 25C illustrates a rear view of an exemplary embodiment of a takedown pin, according to the present disclosure.

FIGS. 25A-25B illustrate certain elements or components of an exemplary embodiment of a takedown pin 600. In various exemplary, nonlimiting embodiments, the takedown pin 600 comprises at least some of a head 610, a shank 630 extending from the head 610 to a terminal surface 634, an optional intermediate portion 620, a projection 635, a first groove or slot 640 having an associated first detent recess 642 and second detent recess 647, a second groove or slot 650 having an associated first detent recess 652 and second detent recess 657, and a connecting groove or slot 660.

It should be appreciated that these elements correspond to and are substantially similar in form and/or function to the head 510, the shank 530 extending from the head 510 to the terminal surface 534, the optional intermediate portion 520, the projection 535, the first groove or slot 540 having the associated first detent recess 542 and second detent recess 547, the second groove or slot 550 having the associated first detent recess 552 and second detent recess 557, and the connecting groove or slot 560, as described herein.

However, as illustrated in FIGS. 25A-25B, in certain illustrative, non-limiting embodiment(s) of the present disclosure, the first groove or slot 640 is not closed or bounded on both ends. Instead, the first groove or slot 640 extends to an open or at least partially open end 643. The open or at least partially open end 643 extends through the terminal surface 634 of the shank 630.

In various exemplary embodiments, at least a portion of the open or at least partially open end 643 includes a ramped surface portion. The ramped surface portion may extend toward the outer surface of the takedown pin 600 or extend away from the outer surface of the takedown pin 600, as the open or at least partially open end 643 extends toward the terminal surface 634 of the shank 630.

By extending the first groove or slot 640 to an open or at least partially open end 643, the takedown pin 600 can be more easily installed in or removed from a lower receiver 20 of a firearm 30. For example, during installation of the takedown pin 600, the open or at least partially open end 653 can be aligned with a detent pin 41, so as to allow a portion of the detent pin 41 to initially enter the first groove or slot 640, through the open or at least partially open end 643. Then, as the shank 630 is further urged into the lower receiver 20, a portion of the detent pin 41 is maintained within the first groove or slot 640.

During potential removal of the takedown pin 600, a sufficient withdrawing force can be applied to the takedown pin 600, such that the detent pin 41 is removed from the second detent recess 657 (if included) sufficient to allow at least a portion of the detent pin 41 to travel to the open or at least partially open end 643 and be removed from the first groove or slot 640 and the takedown pin 600.

In this manner, the takedown pin 600 may optionally be installed or removed from the lower receiver 20 in a non-traditional manner, without requiring removal of the castle nut, buffer tube, and receiver end plate from the lower receiver 20.

Figure 26A:
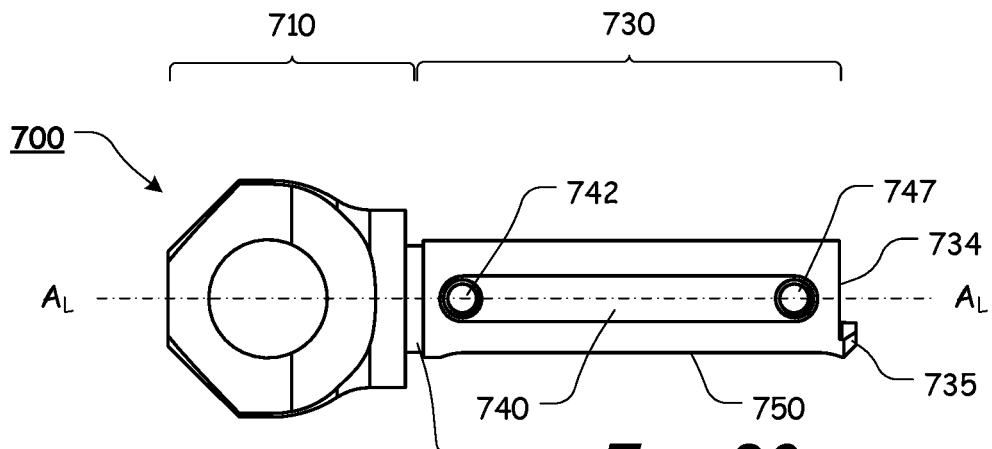
FIG. 26A illustrates a side view of an exemplary embodiment of a takedown pin, according to the present disclosure.
Figure 26B:
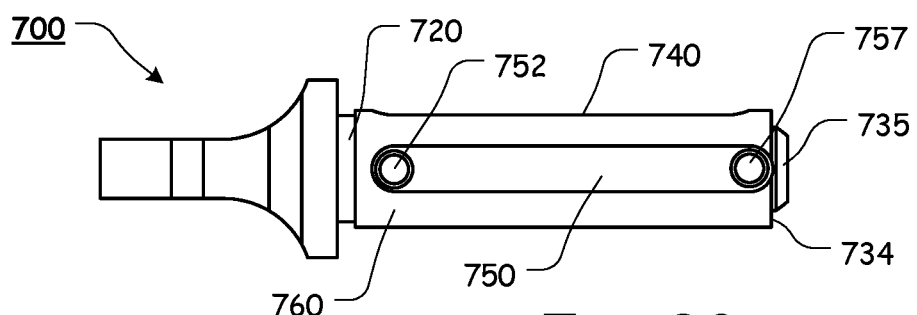
FIG. 26B illustrates a side view of an exemplary embodiment of a takedown pin in a rotated position, according to the present disclosure
Figure 26C:
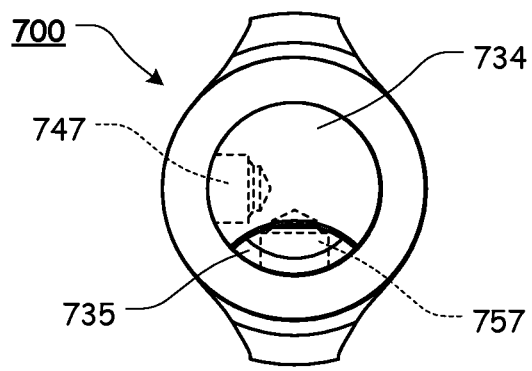
FIG. 26C illustrates a rear view of an exemplary embodiment of a takedown pin, according to the present disclosure.

FIGS. 26A-26B illustrate certain elements or components of an exemplary embodiment of a takedown pin 700. In various exemplary, nonlimiting embodiments, the takedown pin 700 comprises at least some of a head 710, a shank 730 extending from the head 710 to a terminal surface 734, an optional intermediate portion 720, a projection 735, a first groove or slot 740 having an associated first detent recess 742 and second detent recess 747, and a second groove or slot 750 having an associated first detent recess 752 and second detent recess 757.

It should be appreciated that these elements correspond to and are substantially similar in form and/or function to the head 510, the shank 530 extending from the head 510 to the terminal surface 534, the optional intermediate portion 520, the projection 535, the first groove or slot 540 having the associated first detent recess 542 and second detent recess 547, and the second groove or slot 550 having the associated first detent recess 552 and second detent recess 557, as described herein.

However, as illustrated in FIGS. 26A-26B, in certain illustrative, non-limiting embodiment(s) of the present disclosure, the connecting groove or slot 560 is removed and the first groove or slot 740 is separate and discrete from the second groove or slot 750.

By providing a first groove or slot 740 that is separate and discrete from a second groove or slot 750, discrete, desired features of the takedown pin 700 can be utilized, based upon the manner in which the takedown pin 700 is installed in the lower receiver 20. For example, the takedown pin 700 may optionally be installed such that a portion of the detent pin 41 is positioned within the first groove or slot 740. Alternatively, the takedown pin 700 may optionally be installed such that a portion of the detent pin 41 is positioned within the second groove or slot 750.

If the takedown pin 700 is installed such that a portion of the detent pin 41 is positioned within the first groove or slot 740, the takedown pin 700 may only be manipulated between an engaged or locked position and a partially engaged or operably locked position. For example, if the takedown pin 700 is urged from an engaged or locked position (wherein the upper receiver 10 and the lower receiver 20 are maintained in an operable configuration) to a partially engaged or inoperably locked position, the shank 730 is withdrawn a sufficient distance to from the upper takedown pin lug aperture 18 that the terminal surface 734 is withdrawn from the upper takedown pin lug aperture 18. However, in the partially engaged or inoperably locked position, at least a portion of the projection 735 extends into the upper takedown pin lug aperture 18. By maintaining at least a portion of the projection 735 in the upper takedown pin lug aperture 18, the upper receiver 10 is able to be pivoted, via the pivot pin, to an inoperable position, relative to the lower receiver 20. Because at least a portion of the projection 735 is maintained within at least a portion of the upper takedown pin lug aperture 18, the upper receiver 10 is not able to pivot freely, relative to the lower receiver 20, but is only able to pivot between the engaged or locked position and the partially engaged or inoperably locked position.

If the takedown pin 700 is installed such that a portion of the detent pin 41 is positioned within the second groove or slot 750, the takedown pin 700 may only be manipulated between an engaged or locked position and a disengaged or unlocked position. For example, if the takedown pin 700 is urged from an engaged or locked position (wherein the upper receiver 10 and the lower receiver 20 are maintained in an operable configuration) to a disengaged or unlocked position, the detent pin 41 interacts with the second groove or slot 750 such that the shank 730 and projection 735 are withdrawn a (if included) sufficient distance to from the upper takedown pin lug aperture 18 that the terminal surface 734 and through at least a portion of the projection 735 are withdrawn from the upper takedown pin lug aperture 18. By withdrawing the shank 730 and through at least a portion of the projection 735 from the upper takedown pin lug aperture 18, the upper receiver 10 is able to be freely pivoted, via the pivot pin, relative to the lower receiver 20.

Figure 27A:
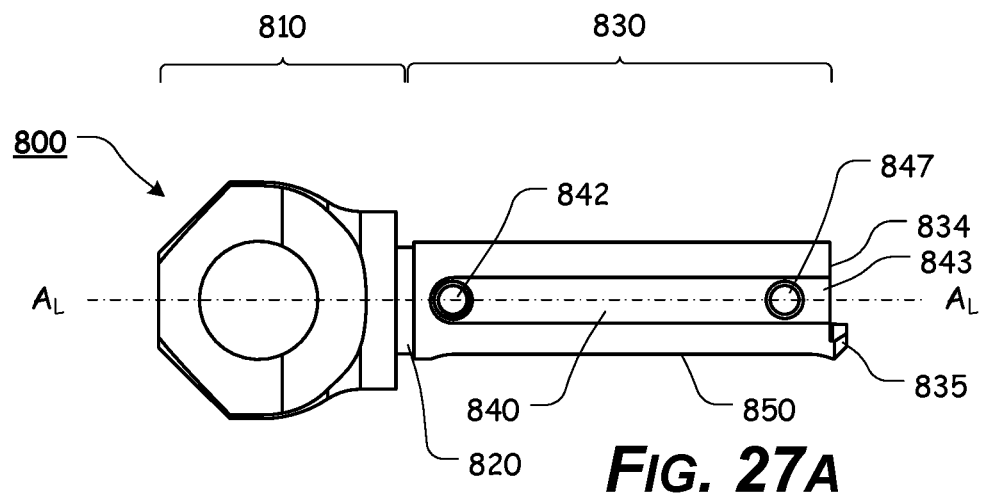
FIG. 27A illustrates a side view of an exemplary embodiment of a takedown pin, according to the present disclosure.
Figure 27B:
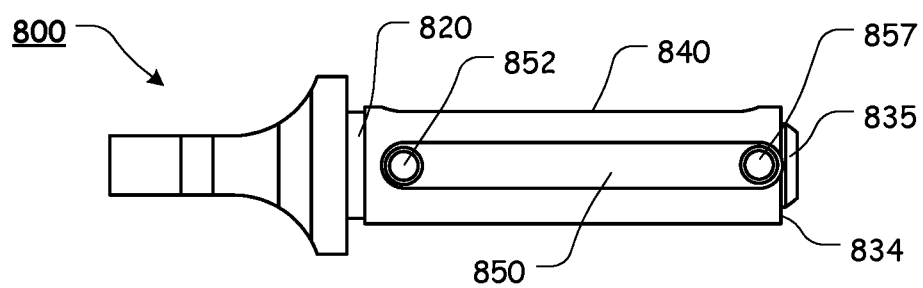
FIG. 27B illustrates a side view of an exemplary embodiment of a takedown pin in a rotated position, according to the present disclosure
Figure 27C:
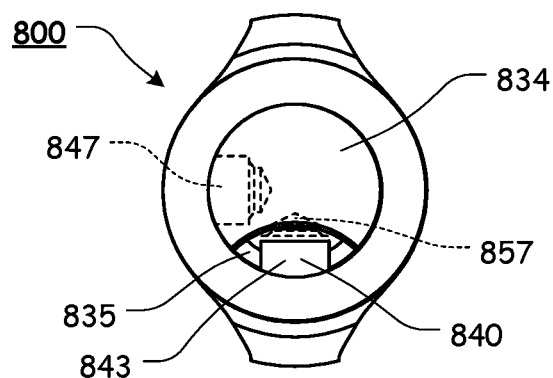
FIG. 27C illustrates a rear view of an exemplary embodiment of a takedown pin, according to the present disclosure.

FIGS. 27A-27B illustrate certain elements or components of an exemplary embodiment of a takedown pin 800. In various exemplary, nonlimiting embodiments, the takedown pin 800 comprises at least some of a head 810, a shank 830 extending from the head 810 to a terminal surface 834, an optional intermediate portion 820, a projection 835, a first groove or slot 840 having an associated first detent recess 842 and second detent recess 847, and a second groove or slot 850 having an associated first detent recess 852 and second detent recess 857.

It should be appreciated that these elements correspond to and are substantially similar in form and/or function to the head 710, the shank 730 extending from the head 710 to the terminal surface 734, the optional intermediate portion 720, the projection 735, the first groove or slot 740 having the associated first detent recess 742 and second detent recess 747, and the second groove or slot 750 having the associated first detent recess 752 and second detent recess 757, as described herein.

However, as illustrated in FIGS. 27A-27B, in certain illustrative, non-limiting embodiment(s) of the present disclosure, the first groove or slot 840 is not closed or bounded on both ends. Instead, the first groove or slot 840 extends to an open or at least partially open end 843. The open or at least partially open end 843 extends through the terminal surface 834 of the shank 830.

In various exemplary embodiments, at least a portion of the open or at least partially open end 843 includes a ramped surface portion. The ramped surface portion may extend toward the outer surface of the takedown pin 800 or extend away from the outer surface of the takedown pin 800, as the open or at least partially open end 843 extends toward the terminal surface 834 of the shank 830.

By extending the first groove or slot 840 to an open or at least partially open end 843, the takedown pin 800 can be more easily installed in or removed from a lower receiver 20 of a firearm 30. For example, during installation of the takedown pin 800, the open or at least partially open end 843 can be aligned with a detent pin 41, so as to allow a portion of the detent pin 41 to initially enter the first groove or slot 840, through the open or at least partially open end 843. Then, as the shank 830 is further urged into the lower receiver 20, a portion of the detent pin 41 is maintained within the first groove or slot 840.

During potential removal of the takedown pin 800, a (if included) sufficient withdrawing force can be applied to the takedown pin 800, such that the detent pin 41 is removed from the second detent recess 847 (if included) sufficient to allow at least a portion of the detent pin 41 to travel to the open or at least partially open end 843 and be removed from the first groove or slot 840 and the takedown pin 800.

In this manner, the takedown pin 800 may optionally be installed or removed from the lower receiver 20 in a non-traditional manner, without requiring removal of the castle nut, buffer tube, and receiver end plate from the lower receiver 20.

Thus, if the takedown pin 800 is installed such that a portion of the detent pin 41 is positioned within the first groove or slot 840, the takedown pin 800 may be manipulated between an engaged or locked position (with the detent pin 41 positioned within or proximate the first detent recess 842), a partially engaged or operably locked position (with the detent pin 41 positioned within or proximate the second detent recess 847), or a removed position, where in the detent pin 41 is urged past the second detent recess 847, through the open or at least partially open end 843.

Figure 28A:
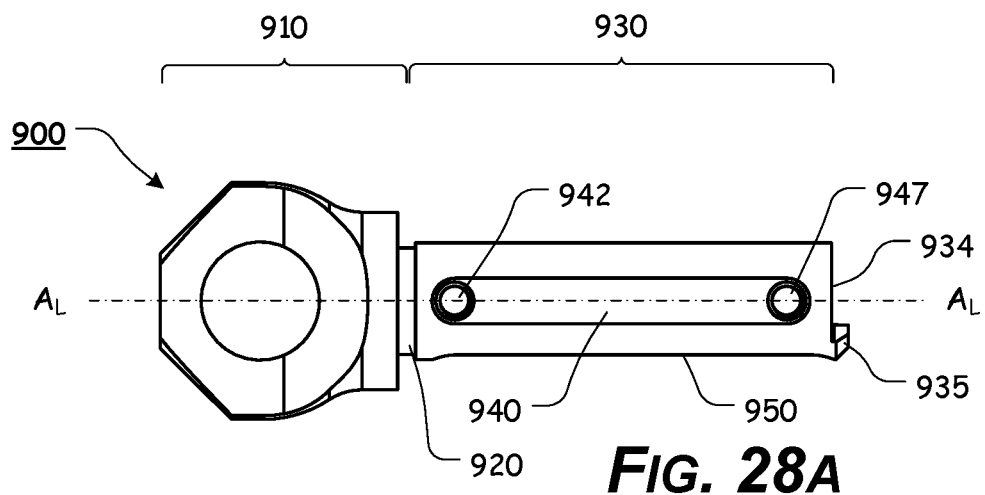
FIG. 28A illustrates a side view of an exemplary embodiment of a takedown pin, according to the present disclosure.
Figure 28B:
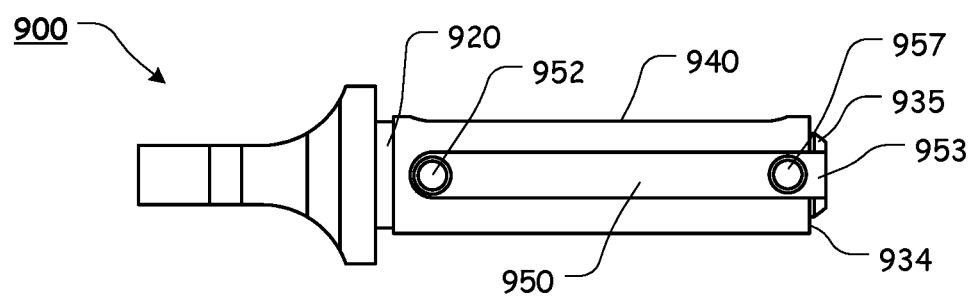
FIG. 28B illustrates a side view of an exemplary embodiment of a takedown pin in a rotated position, according to the present disclosure
Figure 28C:
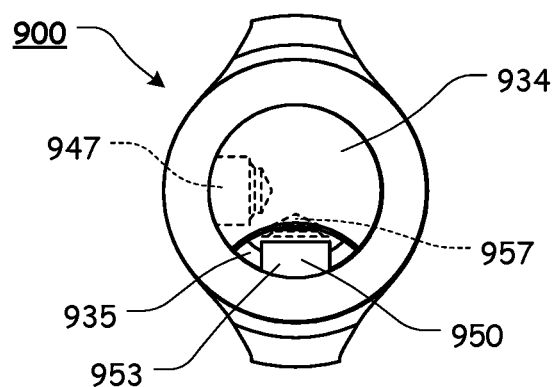
FIG. 28C illustrates a rear view of an exemplary embodiment of a takedown pin, according to the present disclosure.
Figure 29A:
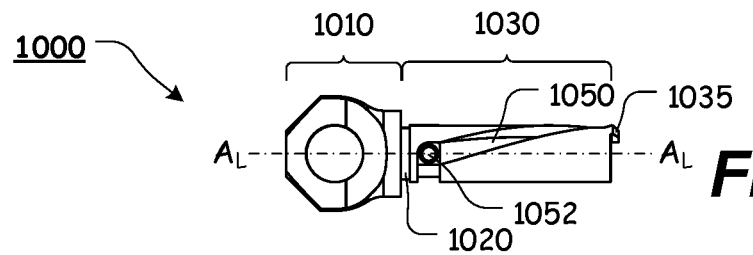
FIG. 29A illustrates a side view of an exemplary embodiment of a takedown pin, according to the present disclosure.
Figure 29B:
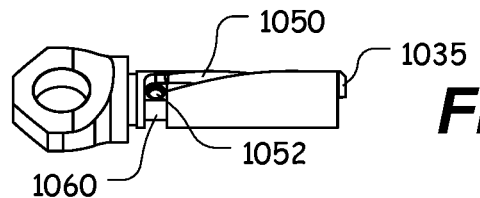
FIG. 29B illustrates a side view of an exemplary embodiment of a takedown pin in a rotated position, according to the present disclosure.
Figure 29C:
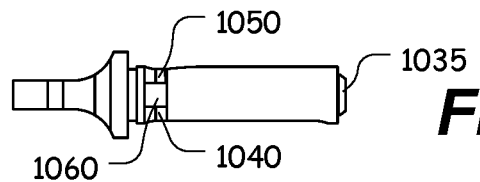
FIG. 29C illustrates a side view of an exemplary embodiment of a takedown pin in a rotated position, according to the present disclosure.
Figure 29D:
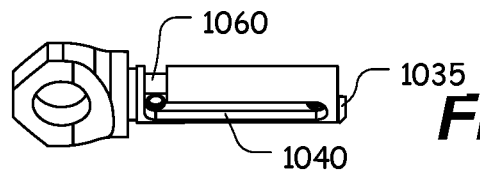
FIG. 29D illustrates a side view of an exemplary embodiment of a takedown pin in a rotated position, according to the present disclosure.
Figure 29E:
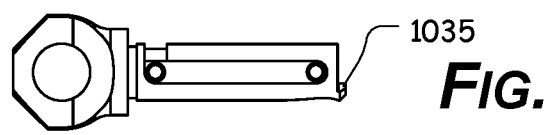
FIG. 29E illustrates a side view of an exemplary embodiment of a takedown pin in a rotated position, according to the present disclosure.
Figure 29F:
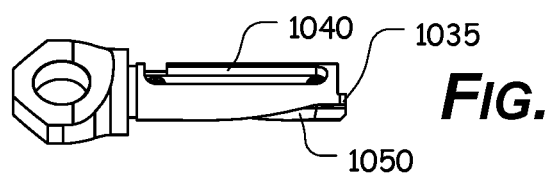
FIG. 29F illustrates an upper, rear perspective view of an exemplary embodiment of a takedown pin in a rotated position, according to the present disclosure.
Figure 29G:
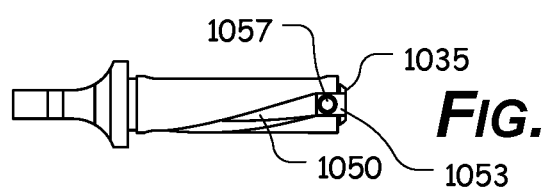
FIG. 29G illustrates an upper, rear perspective view of an exemplary embodiment of a takedown pin in a rotated position, according to the present disclosure.
Figure 29H:
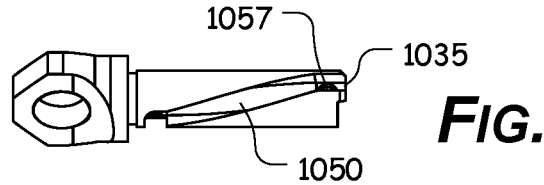
FIG. 29H illustrates a front view of an exemplary embodiment of a takedown pin, according to the present disclosure.
Figure 30A:
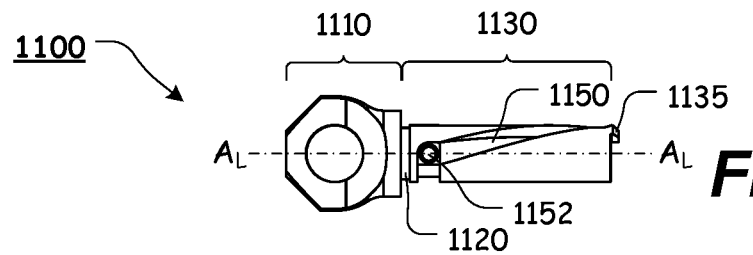
FIG. 30A illustrates a side view of an exemplary embodiment of a takedown pin, according to the present disclosure.
Figure 30B:
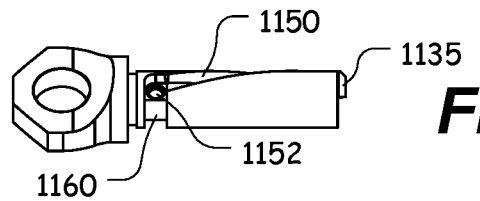
FIG. 30B illustrates a side view of an exemplary embodiment of a takedown pin in a rotated position, according to the present disclosure.
Figure 30C:
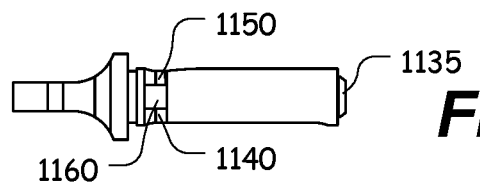
FIG. 30C illustrates a side view of an exemplary embodiment of a takedown pin in a rotated position, according to the present disclosure.
Figure 30D:
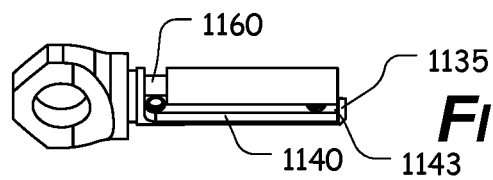
FIG. 30D illustrates a side view of an exemplary embodiment of a takedown pin in a rotated position, according to the present disclosure.
Figure 30E:
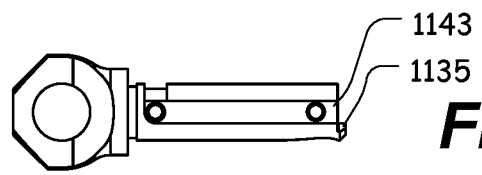
FIG. 30E illustrates a side view of an exemplary embodiment of a takedown pin in a rotated position, according to the present disclosure.
Figure 30F:
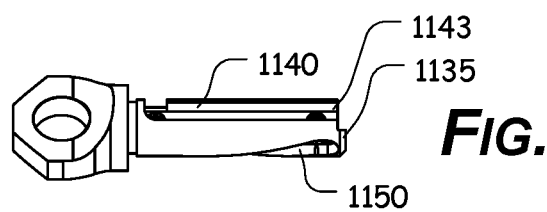
FIG. 30F illustrates an upper, rear perspective view of an exemplary embodiment of a takedown pin in a rotated position, according to the present disclosure.
Figure 30G:
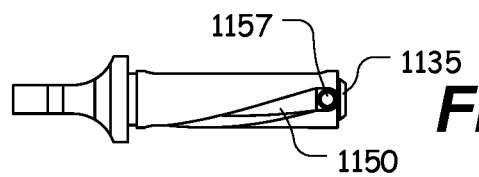
FIG. 30G illustrates an upper, rear perspective view of an exemplary embodiment of a takedown pin in a rotated position, according to the present disclosure.
Figure 30H:
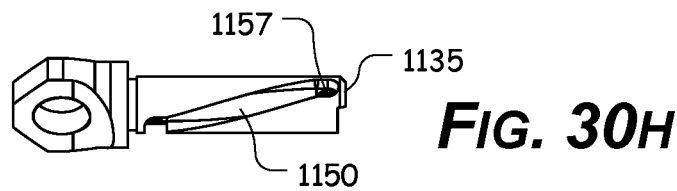
FIG. 30H illustrates a front view of an exemplary embodiment of a takedown pin, according to the present disclosure.
Figure 31A:
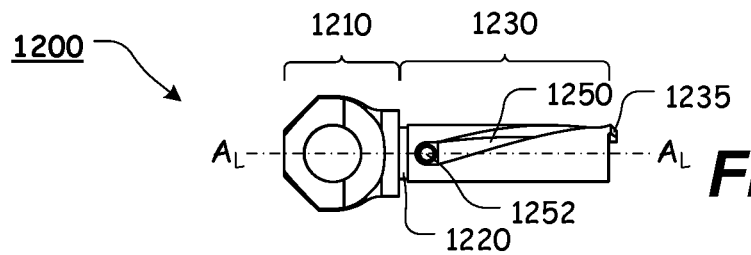
FIG. 31A illustrates a side view of an exemplary embodiment of a takedown pin, according to the present disclosure.
Figure 31B:
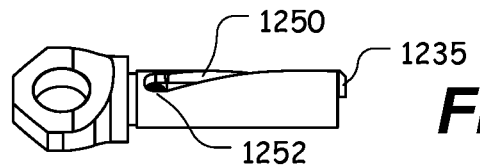
FIG. 31B illustrates a side view of an exemplary embodiment of a takedown pin in a rotated position, according to the present disclosure.
Figure 31C:
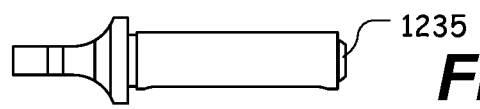
FIG. 31C illustrates a side view of an exemplary embodiment of a takedown pin in a rotated position, according to the present disclosure.
Figure 31D:
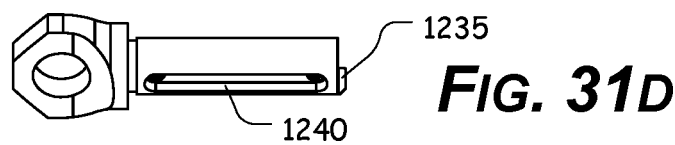
FIG. 31D illustrates a side view of an exemplary embodiment of a takedown pin in a rotated position, according to the present disclosure.
Figure 31E:
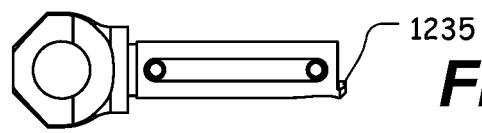
FIG. 31E illustrates a side view of an exemplary embodiment of a takedown pin in a rotated position, according to the present disclosure.
Figure 31F:
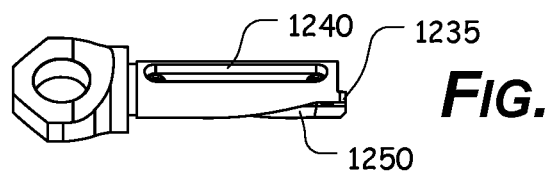
FIG. 31F illustrates an upper, rear perspective view of an exemplary embodiment of a takedown pin in a rotated position, according to the present disclosure.
Figure 31G:
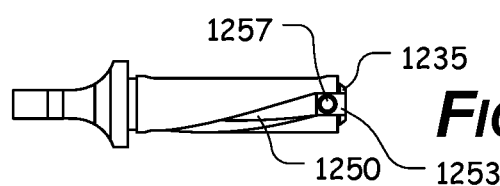
FIG. 31G illustrates an upper, rear perspective view of an exemplary embodiment of a takedown pin in a rotated position, according to the present disclosure.
Figure 31H:
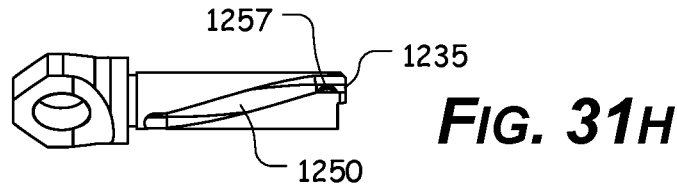
FIG. 31H illustrates a front view of an exemplary embodiment of a takedown pin, according to the present disclosure.
Figure 32A:
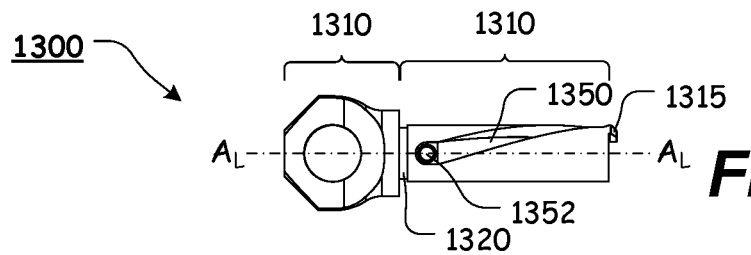
FIG. 32A illustrates a side view of an exemplary embodiment of a takedown pin, according to the present disclosure.
Figure 32B:
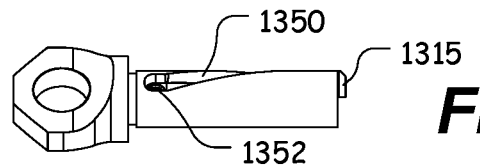
FIG. 32B illustrates a side view of an exemplary embodiment of a takedown pin in a rotated position, according to the present disclosure.
Figure 32C:
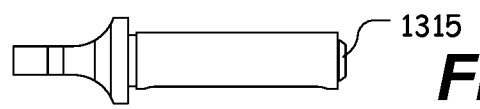
FIG. 32C illustrates a side view of an exemplary embodiment of a takedown pin in a rotated position, according to the present disclosure.
Figure 32D:
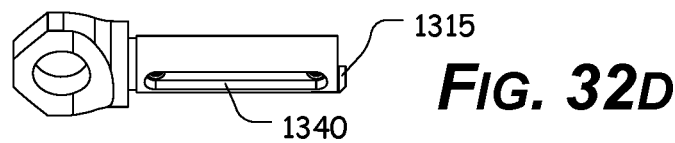
FIG. 32D illustrates a side view of an exemplary embodiment of a takedown pin in a rotated position, according to the present disclosure.
Figure 32E:
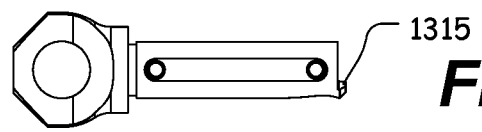
FIG. 32E illustrates a side view of an exemplary embodiment of a takedown pin in a rotated position, according to the present disclosure.
Figure 32F:
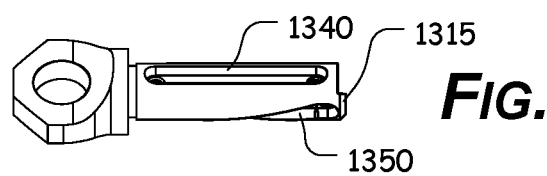
FIG. 32F illustrates an upper, rear perspective view of an exemplary embodiment of a takedown pin in a rotated position, according to the present disclosure.
Figure 32G:
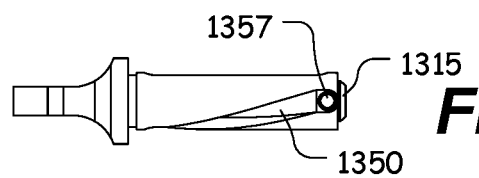
FIG. 32G illustrates an upper, rear perspective view of an exemplary embodiment of a takedown pin in a rotated position, according to the present disclosure.
Figure 32H:
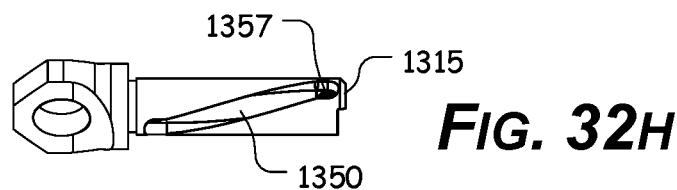
FIG. 32H illustrates a front view of an exemplary embodiment of a takedown pin, according to the present disclosure.

FIGS. 28A-28B illustrate certain elements or components of an exemplary embodiment of a takedown pin 900. In various exemplary, nonlimiting embodiments, the takedown pin 900 comprises at least some of a head 910, a shank 930 extending from the head 910 to a terminal surface 934, an optional intermediate portion 920, a projection 935, a first groove or slot 940 having an associated first detent recess 942 and second detent recess 947, and a second groove or slot 950 having an associated first detent recess 952 and second detent recess 957.

It should be appreciated that these elements correspond to and are substantially similar in form and/or function to the head 710, the shank 730 extending from the head 710 to the terminal surface 734, the optional intermediate portion 720, the projection 735, the first groove or slot 740 having the associated first detent recess 742 and second detent recess 747, and the second groove or slot 750 having the associated first detent recess 752 and second detent recess 757, as described herein.

However, as illustrated in FIGS. 28A-28B, in certain illustrative, non-limiting embodiment(s) of the present disclosure, the second groove or slot 950 is not closed or bounded on both ends. Instead, the second groove or slot 950 extends to an open or at least partially open end 953. The open or at least partially open end 953 extends through the terminal surface 934 of the shank 930 and through at least a portion of the projection 935.

In various exemplary embodiments, at least a portion of the open or at least partially open end 953 includes a ramped surface portion. The ramped surface portion may extend toward the outer surface of the takedown pin 900 or extend away from the outer surface of the takedown pin 900, as the open or at least partially open end 953 extends toward the terminal surface 934 of the shank 930.

By extending the second groove or slot 950 to an open or at least partially open end 953, the takedown pin 900 can be more easily installed in or removed from a lower receiver 20 of a firearm 30. For example, during installation of the takedown pin 900, the open or at least partially open end 953 can be aligned with a detent pin 41, so as to allow a portion of the detent pin 41 to initially enter the second groove or slot 950, through the open or at least partially open end 953. Then, as the shank 930 is further urged into the lower receiver 20, a portion of the detent pin 41 is maintained within the second groove or slot 950.

During potential removal of the takedown pin 900, a sufficient withdrawing force can be applied to the takedown pin 900, such that the detent pin 41 is removed from the second detent recess 957 (if included) sufficient to allow at least a portion of the detent pin 41 to travel to the open or at least partially open end 953 and be removed from the second groove or slot 950 and the takedown pin 900.

In this manner, the takedown pin 900 may optionally be installed or removed from the lower receiver 20 in a non-traditional manner, without requiring removal of the castle nut, buffer tube, and receiver end plate from the lower receiver 20.

Thus, if the takedown pin 900 is installed such that a portion of the detent pin 41 is positioned within the second groove or slot 950, the takedown pin 900 may be manipulated between an engaged or locked position, a disengaged or unlocked position, and a removal position.

FIGS. 29A-29H illustrate certain elements or components of an exemplary embodiment of a takedown pin 1000. In various exemplary, nonlimiting embodiments, the takedown pin 1000 comprises at least some of a head 1010, a shank 1030 extending from the head 1010 to a terminal surface 1034, an optional intermediate portion 1020, a projection 1035, a first groove or slot 1040 having an associated first detent recess 1042 and second detent recess 1047, a second groove or slot 1050 having an associated first detent recess 1052 and second detent recess 1057, and a connecting groove or slot 1060.

It should be appreciated that these elements correspond to and are substantially similar in form and/or function to the head 310, the shank 330 extending from the head 310 to the terminal surface 334, the optional intermediate portion 320, the projection 335, the first groove or slot 340 having the associated first detent recess 342 and second detent recess 347, the second groove or slot 350 having the associated first detent recess 352 and second detent recess 357, and the connecting groove or slot 360, as described herein.

However, as illustrated in FIGS. 29A-29H, in certain illustrative, non-limiting embodiment(s) of the present disclosure, the second groove or slot 1050 is not closed or bounded on both ends. Instead, the second groove or slot 1050 extends to an open or at least partially open end 1053. The open or at least partially open end 1053 extends through the terminal surface 1034 of the shank 1030 and through at least a portion of the projection 1035.

In various exemplary embodiments, at least a portion of the open or at least partially open end 1053 includes a ramped surface portion. The ramped surface portion may extend toward the outer surface of the takedown pin 1000 or extend away from the outer surface of the takedown pin 1000, as the open or at least partially open end 1053 extends toward the terminal surface 1034 of the shank 1030.

By extending the second groove or slot 1050 to an open or at least partially open end 1053, the takedown pin 1000 can be more easily installed in or removed from a lower receiver 20 of a firearm 30. For example, during installation of the takedown pin 1000, the open or at least partially open end 1053 can be aligned with a detent pin 41, so as to allow a portion of the detent pin 41 to initially enter the second groove or slot 1050, through the open or at least partially open end 1053. Then, as the shank 1030 is further urged into the lower receiver 20, a portion of the detent pin 41 is maintained within the second groove or slot 1050.

During potential removal of the takedown pin 1000, a sufficient withdrawing force can be applied to the takedown pin 1000, such that the detent pin 41 is removed from the second detent recess 1057 (if included) sufficient to allow at least a portion of the detent pin 41 to travel to the open or at least partially open end 1053 and be removed from the second groove or slot 1050 and the takedown pin 1000.

In this manner, the takedown pin 1000 may optionally be installed or removed from the lower receiver 20 in a non-traditional manner, without requiring removal of the castle nut, buffer tube, and receiver end plate from the lower receiver 20.

FIGS. 30A-30H illustrate certain elements or components of an exemplary embodiment of a takedown pin 1100. In various exemplary, nonlimiting embodiments, the takedown pin 1100 comprises at least some of a head 1110, a shank 1130 extending from the head 1110 to a terminal surface 1134, an optional intermediate portion 1120, a projection 1135, a first groove or slot 1140 having an associated first detent recess 1142 and second detent recess 1147, a connecting groove or slot 1160, and a second groove or slot 1150 having an associated first detent recess 1152 and second detent recess 1157.

It should be appreciated that these elements correspond to and are substantially similar in form and/or function to the head 310, the shank 330 extending from the head 310 to the terminal surface 334, the optional intermediate portion 320, the projection 335, the first groove or slot 340 having the associated first detent recess 342 and second detent recess 347, the connecting groove or slot 360, and the second groove or slot 350 having the associated first detent recess 352 and second detent recess 357, as described herein.

However, as illustrated in FIGS. 30A-30H, in certain illustrative, non-limiting embodiment(s) of the present disclosure, the first groove or slot 1140 is not closed or bounded on both ends. Instead, the first groove or slot 1140 extends to an open or at least partially open end 1143. The open or at least partially open end 1143 extends through the terminal surface 1134 of the shank 1130.

In various exemplary embodiments, at least a portion of the open or at least partially open end 1143 includes a ramped surface portion. The ramped surface portion may extend toward the outer surface of the takedown pin 1100 or extend away from the outer surface of the takedown pin 1100, as the open or at least partially open end 1143 extends toward the terminal surface 1134 of the shank 1130.

By extending the first groove or slot 1140 to an open or at least partially open end 1143, the takedown pin 1100 can be more easily installed in or removed from a lower receiver 20 of a firearm 30. For example, during installation of the takedown pin 1100, the open or at least partially open end 1143 can be aligned with a detent pin 41, so as to allow a portion of the detent pin 41 to initially enter the first groove or slot 1140, through the open or at least partially open end 1143. Then, as the shank 1130 is further urged into the lower receiver 20, a portion of the detent pin 41 is maintained within the first groove or slot 1140.

During potential removal of the takedown pin 1100, a sufficient withdrawing force can be applied to the takedown pin 1100, such that the detent pin 41 is removed from the second detent recess 1157 (if included) sufficient to allow at least a portion of the detent pin 41 to travel to the open or at least partially open end 1143 and be removed from the first groove or slot 1140 and the takedown pin 1100.

In this manner, the takedown pin 1100 may optionally be installed or removed from the lower receiver 20 in a non-traditional manner, without requiring removal of the castle nut, buffer tube, and receiver end plate from the lower receiver 20.

FIGS. 31A-31H illustrate certain elements or components of an exemplary embodiment of a takedown pin 1200. In various exemplary, nonlimiting embodiments, the takedown pin 1200 comprises at least some of a head 1210, a shank 1231 extending from the head 1210 to a terminal surface 1234, an optional intermediate portion 1220, a projection 1235, a first groove or slot 1240 having an associated first detent recess 1242 and second detent recess 1247, and a second groove or slot 1250 having an associated first detent recess 1252 and second detent recess 1257.

It should be appreciated that these elements correspond to and are substantially similar in form and/or function to the head 1010, the shank 1031 extending from the head 1010 to the terminal surface 1034, the optional intermediate portion 1020, the projection 1035, the first groove or slot 1040 having the associated first detent recess 1042 and second detent recess 1047, and the second groove or slot 1050 having the associated first detent recess 1052 and second detent recess 1057, as described herein.

However, as illustrated in FIGS. 31A-31H, in certain illustrative, non-limiting embodiment(s) of the present disclosure, the connecting groove or slot 1060 is removed and the first groove or slot 1240 is separate and discrete from the second groove or slot 1250. Furthermore, the second groove or slot 1250 extends to an open or at least partially open end 1253.

In various exemplary embodiments, at least a portion of the open or at least partially open end 1253 includes a ramped surface portion. The ramped surface portion may extend toward the outer surface of the takedown pin 1200 or extend away from the outer surface of the takedown pin 1200, as the open or at least partially open end 1253 extends toward the terminal surface 1234 of the shank 1230.

By extending the second groove or slot 1250 to an open or at least partially open end 1253, the takedown pin 1200 can be more easily installed in or removed from a lower receiver 20 of a firearm 30. For example, during installation of the takedown pin 1200, the open or at least partially open end 1253 can be aligned with a detent pin 41, so as to allow a portion of the detent pin 41 to initially enter the second groove or slot 1250, through the open or at least partially open end 1253. Then, as the shank 1231 is further urged into the lower receiver 20, a portion of the detent pin 41 is maintained within the second groove or slot 1250.

During potential removal of the takedown pin 1200, a sufficient withdrawing force can be applied to the takedown pin 1200, such that the detent pin 41 is removed from the second detent recess 1257 (if included) sufficient to allow at least a portion of the detent pin 41 to travel to the open or at least partially open end 1253 and be removed from the second groove or slot 1250 and the takedown pin 1200.

In this manner, the takedown pin 1200 may optionally be installed or removed from the lower receiver 20 in a non-traditional manner, without requiring removal of the castle nut, buffer tube, and receiver end plate from the lower receiver 20.

FIGS. 32A-32H illustrate certain elements or components of an exemplary embodiment of a takedown pin 1300. In various exemplary, nonlimiting embodiments, the takedown pin 1300 comprises at least some of a head 1310, a shank 1332 extending from the head 1310 to a terminal surface 1334, an optional intermediate portion 1320, a projection 1335, a first groove or slot 1340 having an associated first detent recess 1342 and second detent recess 1347, and a second groove or slot 1350 having an associated first detent recess 1352 and second detent recess 1357.

It should be appreciated that these elements correspond to and are substantially similar in form and/or function to the head 1010, the shank 1032 extending from the head 1010 to the terminal surface 1034, the optional intermediate portion 1020, the projection 1035, the first groove or slot 1040 having the associated first detent recess 1042 and second detent recess 1047, and the second groove or slot 1050 having the associated first detent recess 1052 and second detent recess 1057, as described herein.

However, as illustrated in FIGS. 32A-32H, in certain illustrative, non-limiting embodiment(s) of the present disclosure, the connecting groove or slot 1060 is removed and the first groove or slot 1340 is separate and discrete from the second groove or slot 1350.

Figure 33A:
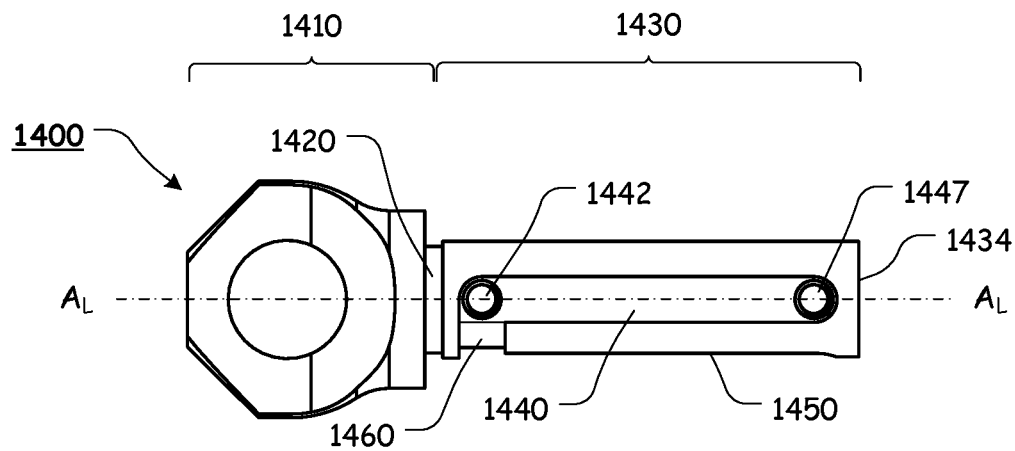
FIG. 33A illustrates a side view of an exemplary embodiment of a takedown pin, according to the present disclosure.
Figure 33B:
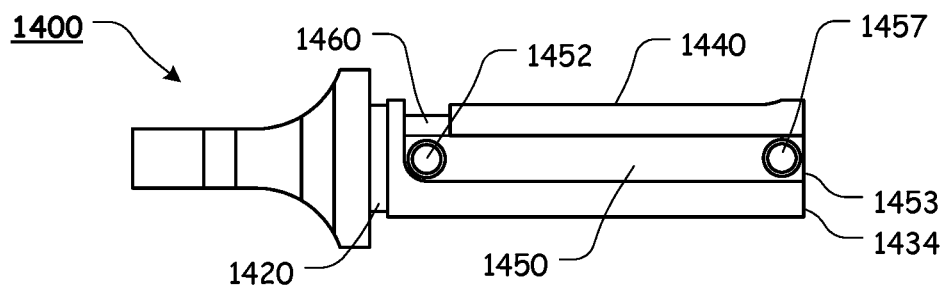
FIG. 33B illustrates a side view of an exemplary embodiment of a takedown pin in a rotated position, according to the present disclosure
Figure 33C:
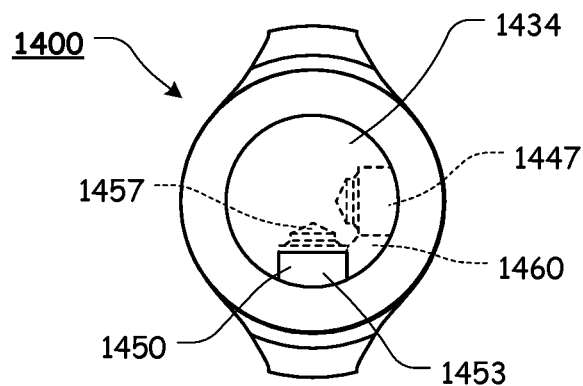
FIG. 33C illustrates a rear view of an exemplary embodiment of a takedown pin, according to the present disclosure.
Figure 34A:
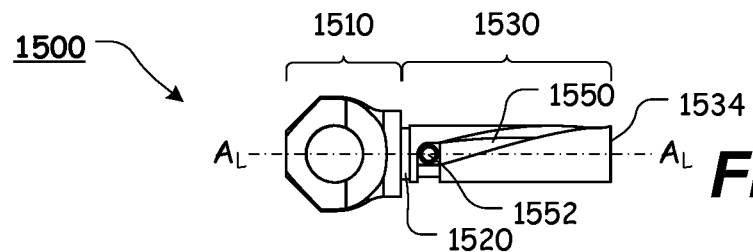
FIG. 34A illustrates a side view of an exemplary embodiment of a takedown pin, according to the present disclosure.
Figure 34B:
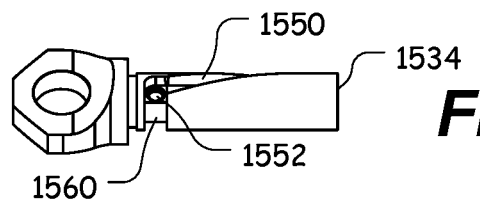
FIG. 34B illustrates a side view of an exemplary embodiment of a takedown pin in a rotated position, according to the present disclosure.
Figure 34C:
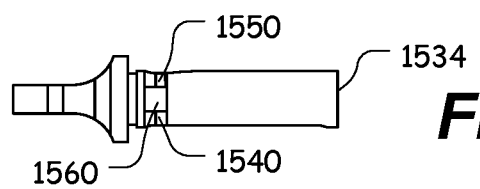
FIG. 34C illustrates a side view of an exemplary embodiment of a takedown pin in a rotated position, according to the present disclosure.
Figure 34D:
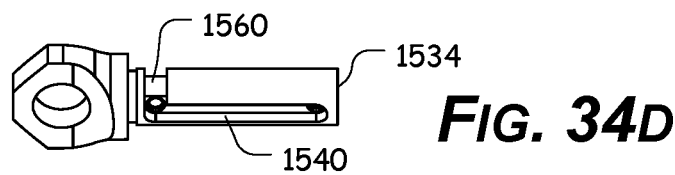
FIG. 34D illustrates a side view of an exemplary embodiment of a takedown pin in a rotated position, according to the present disclosure.
Figure 34E:
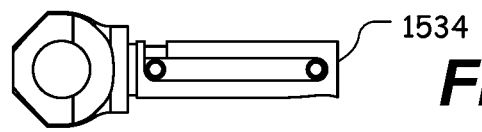
FIG. 34E illustrates a side view of an exemplary embodiment of a takedown pin in a rotated position, according to the present disclosure.
Figure 34F:
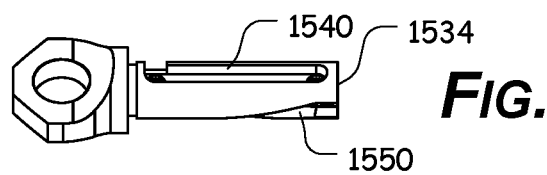
FIG. 34F illustrates an upper, rear perspective view of an exemplary embodiment of a takedown pin in a rotated position, according to the present disclosure.
Figure 34G:
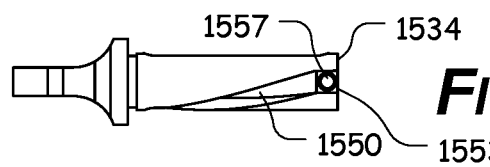
FIG. 34G illustrates an upper, rear perspective view of an exemplary embodiment of a takedown pin in a rotated position, according to the present disclosure.
Figure 34H:
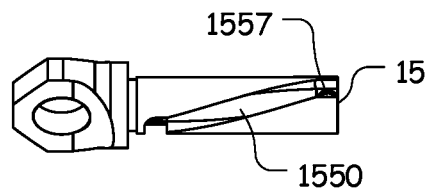
FIG. 34H illustrates a front view of an exemplary embodiment of a takedown pin, according to the present disclosure.

FIGS. 33A-33B illustrate certain elements or components of an exemplary embodiment of a takedown pin 1400. In various exemplary, nonlimiting embodiments, the takedown pin 1400 comprises at least some of a head 1410, a shank 1430 extending from the head 1410 to a terminal surface 1434, an optional intermediate portion 1420, a first groove or slot 1440 having an associated first detent recess 1442 and second detent recess 1447, a second groove or slot 1450 having an associated first detent recess 1452 and second detent recess 1457, and a connecting groove or slot 1460.

It should be appreciated that these elements correspond to and are substantially similar in form and/or function to the head 410, the shank 430 extending from the head 410 to the terminal surface 434, the optional intermediate portion 420, the first groove or slot 440 having the associated first detent recess 442 and second detent recess 447, the second groove or slot 450 having the associated first detent recess 452 and second detent recess 457, and the connecting groove or slot 460, as described herein.

However, as illustrated in FIGS. 33A-33B, in certain illustrative, non-limiting embodiment(s) of the present disclosure, the projection 435 is not included and the second groove or slot 1450 is not closed or bounded on both ends. Instead, the second groove or slot 1450 extends to an open or at least partially open end 1453. The open or at least partially open end 1453 extends through the terminal surface 1434 of the shank 1430.

In various exemplary embodiments, at least a portion of the open or at least partially open end 1453 includes a ramped surface portion. The ramped surface portion may extend toward the outer surface of the takedown pin 1400 or extend away from the outer surface of the takedown pin 1400, as the open or at least partially open end 1453 extends toward the terminal surface 1434 of the shank 1430.

By extending the second groove or slot 1450 to an open or at least partially open end 1453, the takedown pin 1400 can be more easily installed in or removed from a lower receiver 20 of a firearm 30. For example, during installation of the takedown pin 1400, the open or at least partially open end 1453 can be aligned with a detent pin 41, so as to allow a portion of the detent pin 41 to initially enter the second groove or slot 1450, through the open or at least partially open end 1453. Then, as the shank 1430 is further urged into the lower receiver 20, a portion of the detent pin 41 is maintained within the second groove or slot 1450.

During potential removal of the takedown pin 1400, a sufficient withdrawing force can be applied to the takedown pin 1400, such that the detent pin 41 is removed from the second detent recess 1457 (if included) sufficient to allow at least a portion of the detent pin 41 to travel to the open or at least partially open end 1453 and be removed from the second groove or slot 1450 and the takedown pin 1400.

In this manner, the takedown pin 1400 may optionally be installed or removed from the lower receiver 20 in a nontraditional manner, without requiring removal of the castle nut, buffer tube, and receiver end plate from the lower receiver 20.

FIGS. 34A-34H illustrate certain elements or components of an exemplary embodiment of a takedown pin 1500. In various exemplary, nonlimiting embodiments, the takedown pin 1500 comprises at least some of a head 1510, a shank 1530 extending from the head 1510 to a terminal surface 1534, an optional intermediate portion 1520, a first groove or slot 1540 having an associated first detent recess 1542 and second detent recess 1547, a second groove or slot 1550 having an associated first detent recess 1552 and second detent recess 1557, and a connecting groove or slot 1560.

It should be appreciated that these elements correspond to and are substantially similar in form and/or function to the head 1010, the shank 1030 extending from the head 1010 to the terminal surface 1034, the optional intermediate portion 1020, the first groove or slot 1040 having the associated first detent recess 1042 and second detent recess 1047, the second groove or slot 1050 having the associated first detent recess 1052 and second detent recess 1057, and the connecting groove or slot 1060, as described herein.

However, as illustrated in FIGS. 34A-34H, in certain illustrative, non-limiting embodiment(s) of the present disclosure, the projection 1035 is not included and the second groove or slot 1450 extends to an open or at least partially open end 1453. The open or at least partially open end 1453 extends through the terminal surface 1434 of the shank 1430.

In various exemplary embodiments, at least a portion of the open or at least partially open end 1553 includes a ramped surface portion. The ramped surface portion may extend toward the outer surface of the takedown pin 1500 or extend away from the outer surface of the takedown pin 1500, as the open or at least partially open end 1553 extends toward the terminal surface 1534 of the shank 1530.

By extending the second groove or slot 1550 to an open or at least partially open end 1553, the takedown pin 1500 can be more easily installed in or removed from a lower receiver 20 of a firearm 30.

In this manner, the takedown pin 1500 may optionally be installed or removed from the lower receiver 20 in a non-traditional manner, without requiring removal of the castle nut, buffer tube, and receiver end plate from the lower receiver 20.

While the present disclosure has been described in conjunction with the exemplary embodiments outlined above, the foregoing description of exemplary embodiments of the disclosure, as set forth above, are intended to be illustrative, not limiting and the fundamental disclosed systems, methods, and/or apparatuses of the present disclosure should not be considered to be necessarily so constrained. It is evident that the present disclosure is not limited to the particular variation set forth and many alternatives, adaptations modifications, and/or variations will be apparent to those skilled in the art.

It is to be understood that the phraseology of terminology employed herein is for the purpose of description and not of limitation. Unless defined otherwise, all technical and scientific terms used herein have the same meaning as commonly understood by one of ordinary skill in the art to which the present disclosure belongs.

In addition, it is contemplated that any optional feature of the inventive variations described herein may be set forth and claimed independently, or in combination with any one or more of the features described herein.

Accordingly, the foregoing description of exemplary embodiments will reveal the general nature of the disclosure, such that others may, by applying current knowledge, change, vary, modify, and/or adapt these exemplary, non-limiting embodiments for various applications without departing from the spirit and scope of the disclosure and elements or methods similar or equivalent to those described herein can be used in practicing the present disclosure. Any and all such changes, variations, modifications, and/or adaptations should and are intended to be comprehended within the meaning and range of equivalents of the disclosed exemplary embodiments and may be substituted without departing from the true spirit and scope of the disclosure.

Also, it is noted that as used herein and in the appended claims, the singular forms "a", "and", "said", and "the" include plural referents unless the context clearly dictates otherwise. Conversely, it is contemplated that the claims may be so-drafted to require singular elements or exclude any optional element indicated to be so here in the text or drawings. This statement is intended to serve as antecedent basis for use of such exclusive terminology as "solely", "only", and the like in connection with the recitation of claim elements or the use of a "negative" claim limitation(s).

What is claimed is:

1. A takedown pin, comprising:
a head;
a shank, wherein said shank extends, along a longitudinal axis, from said head to a terminal surface;
a projection extending from at least a portion of said terminal surface;
a first groove or slot formed in at least a portion of said shank, wherein a first detent recess is formed proximate a first end of said first groove or slot, and wherein a second detent recess is formed proximate a second end of said first groove or slot;
a second groove or slot formed in at least a portion of said shank, wherein a first detent recess is formed proximate a first end of said second groove or slot, wherein a second detent recess is formed proximate a second end of said second groove or slot, wherein said second end of said second groove or slot extends to an open or at least partially open end that extends through said terminal surface of said shank and through at least a portion of said projection, and wherein said first end of said first groove or slot is positioned at a spaced apart location from said first end of said second groove or slot; and a connecting groove or slot formed between said first end of said first groove or slot and said first end of said second groove or slot.

2. The takedown pin of claim 1, wherein said first groove or slot defines an elongate, substantially linear first groove or slot that extends along said longitudinal axis.

3. The takedown pin of claim 1, wherein said first groove or slot limits rotational movement and longitudinal movement of said takedown pin, relative to a lower receiver.

4. The takedown pin of claim 1, wherein if said takedown pin is appropriately positioned within a lower receiver of a firearm, a detent pin positioned at least partially within said first groove or slot interacts with said first groove or slot so that said takedown pin can be repeatedly urged between an engaged or locked position, wherein said firearm is operable, and a partially engaged or inoperably locked position, wherein said firearm is inoperable.

5. The takedown pin of claim 1, wherein said first detent recess of said first groove or slot is associated with an engaged or locked position and said second detent recess of said first groove or slot is associated with a partially engaged or inoperably locked position.

6. The takedown pin of claim 1, wherein said second groove or slot defines an elongate, substantially linear first groove or slot.

7. The takedown pin of claim 1, wherein said second groove or slot defines a substantially arcuate, second groove or slot.

8. The takedown pin of claim 1, wherein said second groove or slot limits said rotational movement of said takedown pin to 90°, on said longitudinal axis of said shank.

9. The takedown pin of claim 1, wherein if said takedown pin is appropriately positioned within a lower receiver of a firearm, a detent pin positioned at least partially within said second groove or slot interacts with said second groove or slot so that said takedown pin can be repeatedly urged between an engaged or locked position, wherein said firearm is operable, and a disengaged or unlocked position, wherein said firearm is inoperable.

10. The takedown pin of claim 1, wherein said first end of said first groove or slot is positioned approximately 180° around said shank from said first end of said second groove or slot.

11. The takedown pin of claim 1, wherein said first end of said first groove or slot is positioned approximately 90° around said shank from said first end of said second groove or slot.

12. The takedown pin of claim 1, wherein said connecting groove or slot is formed so that said takedown pin can be rotated such that a detent pin can engage at least a portion of said connecting groove or slot to transition between said first groove or slot and said second groove or slot.

13. The takedown pin of claim 1, wherein said projection includes an arcuate or semicircular surface portion.

14. The takedown pin of claim 1, wherein said projection comprises a pin that extends from said terminal surface of said shank.

15. A takedown pin, comprising:

a head;

a shank, wherein said shank extends from said head to a terminal surface;

a first groove or slot formed in at least a portion of said shank, wherein a first detent recess is formed proximate a first end of said first groove or slot, and wherein a second detent recess is formed proximate a second end of said first groove or slot;

a second groove or slot formed in at least a portion of said shank, wherein a first detent recess is formed proximate a first end of said second groove or slot, wherein said second end of said second groove or slot extends to an open or at least partially open end that extends through said terminal surface of said shank, and wherein said first end of said first groove or slot is positioned at a spaced apart location from said first end of said second groove or slot; and a connecting groove or slot formed between said first end of said first groove or slot and said first end of said second groove or slot.

16. The takedown pin of claim 15, further comprising a projection extending from at least a portion of said terminal surface.

17. A takedown pin for a firearm, comprising:

a head;

a shank, wherein said shank extends from said head to a terminal surface;

a projection extending from at least a portion of said terminal surface;

a first groove or slot formed in at least a portion of said shank, wherein a first detent recess is formed proximate a first end of said first groove or slot, and wherein a second detent recess is formed proximate a second end of said first groove or slot;

a second groove or slot formed in at least a portion of said shank, wherein said first end of said first groove or slot is positioned at a spaced apart location from a first end of said second groove or slot; and a connecting groove or slot formed between said first groove or slot and said second groove or slot.

18. The takedown pin of claim 17, wherein a detent recess is formed proximate said first end of said second groove or slot, and wherein a detent recess is formed proximate a second end of said second groove or slot.

19. The takedown pin of claim 17, wherein said second end of said first groove or slot extends to an open or at least partially open end that extends through said terminal surface of said shank.

20. The takedown pin of claim 17, wherein a second end of said second groove or slot extends to an open or at least partially open end that extends through said terminal surface of said shank and through at least a portion of said projection.

* * * * *